(12) United States Patent
Maloney et al.

(10) Patent No.: US 9,932,123 B2
(45) Date of Patent: Apr. 3, 2018

(54) MONOCOQUE HELICOPTER FUSELAGE WITH INTEGRAL TAIL BOOM

(75) Inventors: Peter Maloney, Auckland (NZ); Nina Heatley, Auckland (NZ)

(73) Assignee: COMPOSITE HELICOPTERS INTERNATIONAL HOLDINGS LTD, Albany (NZ)

( * ) Notice: Subject to any disclaimer, the term of this patent is extended or adjusted under 35 U.S.C. 154(b) by 571 days.

(21) Appl. No.: 14/124,247

(22) PCT Filed: Jun. 7, 2012

(86) PCT No.: PCT/NZ2012/000087
§ 371 (c)(1),
(2), (4) Date: Mar. 7, 2014

(87) PCT Pub. No.: WO2012/169906
PCT Pub. Date: Dec. 13, 2012

(65) Prior Publication Data
US 2014/0197271 A1    Jul. 17, 2014

(30) Foreign Application Priority Data

Jun. 7, 2011 (NZ) ........................... 593300
Jun. 7, 2011 (NZ) ........................... 593304
Jun. 22, 2011 (NZ) ........................... 593683

(51) Int. Cl.
*B64C 1/00* (2006.01)
*B64D 37/04* (2006.01)
(Continued)

(52) U.S. Cl.
CPC ............ *B64D 37/04* (2013.01); *B29C 65/483* (2013.01); *B29C 65/52* (2013.01); *B29C 65/605* (2013.01);
(Continued)

(58) Field of Classification Search
CPC .............. B64C 1/00; B64C 2001/0054; B64C 2001/0072; B64C 27/00; B64C 27/04; B64C 27/82; B64D 27/00; B64D 37/04
See application file for complete search history.

(56) References Cited

U.S. PATENT DOCUMENTS 2,501,227 A * 3/1950 Lewis .................... B64C 13/30
                                                     123/41.64
2,503,172 A * 4/1950 Pullin .................... B64C 27/82
                                                     244/17.19
(Continued)

FOREIGN PATENT DOCUMENTS

CA           221156 A       7/1922
CN        101883675 A     11/2010
(Continued)

OTHER PUBLICATIONS

Baums, "Helicopter Airframes Made from Fibre-Reinforced Plastic Materials", Plast Europe, Apr. 1, 1993, pp. 82-86.
(Continued)

*Primary Examiner* — Tien Q Dinh
*Assistant Examiner* — Michael A. Fabula
(74) *Attorney, Agent, or Firm* — Morrison & Foerster LLP

(57) ABSTRACT

A composite structure forming a load bearing composite shell for a helicopter, with a shell which defines the exterior of a fuselage and includes a central fuselage section and tail boom, a fuselage which is adapted house an engine or drive train, a layered composite crashworthy seat and support structure and a fastening and a method of fastening by providing an adhesive between two layers which is allowed to flow through opposing holes in the layers to provide a chemical and mechanical attachment between the layers.

18 Claims, 21 Drawing Sheets

(51) Int. Cl.

| | | |
|---|---|---|
| *B60N 2/42* | (2006.01) | |
| *B60N 2/427* | (2006.01) | |
| *B60N 2/68* | (2006.01) | |
| *B64C 27/04* | (2006.01) | |
| *B64C 27/82* | (2006.01) | |
| *B64D 11/06* | (2006.01) | |
| *B29C 65/52* | (2006.01) | |
| *B29C 65/60* | (2006.01) | |
| *B29C 65/00* | (2006.01) | |
| *B29C 70/44* | (2006.01) | |
| *B29C 65/48* | (2006.01) | |
| *B29L 31/30* | (2006.01) | |
| *B29L 31/00* | (2006.01) | |

(52) U.S. Cl.
CPC .......... *B29C 66/532* (2013.01); *B29C 66/54* (2013.01); *B29C 66/543* (2013.01); *B29C 66/545* (2013.01); *B29C 66/721* (2013.01); *B29C 66/72141* (2013.01); *B29C 70/443* (2013.01); *B60N 2/4242* (2013.01); *B60N 2/42709* (2013.01); *B60N 2/686* (2013.01); *B64C 1/00* (2013.01); *B64C 27/04* (2013.01); *B64C 27/82* (2013.01); *B64D 11/0619* (2014.12); *B64D 11/0689* (2013.01); *B29C 66/61* (2013.01); *B29C 66/71* (2013.01); *B29C 66/727* (2013.01); *B29C 66/7212* (2013.01); *B29L 2031/3082* (2013.01); *B29L 2031/3088* (2013.01); *B29L 2031/771* (2013.01); *B64C 2027/8254* (2013.01); *Y02T 50/433* (2013.01)

(56) References Cited

U.S. PATENT DOCUMENTS

| | | | | |
|---|---|---|---|---|
| 2,535,164 | A * | 12/1950 | Seibel | B64C 1/00 244/120 |
| 3,332,643 | A * | 7/1967 | Toner | B64C 27/32 244/17.21 |
| 4,593,870 | A * | 6/1986 | Cronkhite | B64C 1/062 188/375 |
| 4,630,864 | A | 12/1986 | Toll | |
| 5,037,041 | A * | 8/1991 | Unterhitzenberger | B64C 27/04 244/117 R |
| 5,108,044 | A | 4/1992 | Weiner et al. | |
| 5,377,934 | A * | 1/1995 | Hill | B64C 27/04 244/117 R |
| 5,451,015 | A * | 9/1995 | Cronkhite | B64D 37/02 244/119 |
| 5,562,264 | A * | 10/1996 | Bietenhader | B64C 1/00 244/117 R |
| 6,083,604 | A | 7/2000 | Haraga et al. | |
| 6,179,086 | B1 | 1/2001 | Bansemir et al. | |
| 6,729,576 | B2 * | 5/2004 | Kay | B64C 1/06 244/17.11 |
| 2004/0007645 | A1 * | 1/2004 | Carson | B64C 27/605 244/17.25 |
| 2004/0031879 | A1 * | 2/2004 | Kay | B64C 1/06 244/17.11 |
| 2009/0121081 | A1 | 5/2009 | Karem | |
| 2010/0102170 | A1 | 4/2010 | Laconte | |
| 2010/0130093 | A1 | 5/2010 | Van de Rostyne et al. | |
| 2011/0011518 | A1 | 1/2011 | Carstensen et al. | |

FOREIGN PATENT DOCUMENTS

| | | |
|---|---|---|
| DE | 3641363 A1 | 6/1988 |
| GB | 563427 A | 8/1944 |
| JP | 6-156390 A | 6/1994 |
| JP | 6-344993 A | 12/1994 |
| JP | 6-510714 A | 12/1994 |
| JP | 2009-519153 A | 5/2009 |
| WO | 199305888 A1 | 4/1993 |
| WO | 2002028709 A1 | 4/2002 |
| WO | 2008121005 A1 | 10/2008 |

OTHER PUBLICATIONS

International Search Report dated Oct. 10, 2012 for PCT/NZ2012/000087, 8 pages.
Written Opinion dated Oct. 10, 2012 for PCT/NZ2012/000087, 8 pages.
International Preliminary Report on Patentability dated Sep. 24, 2013 for PCT/NZ2012/000087, 10 pages.
Rich, M. et al. "Advanced Composite Airframe Structures". J. American Helicopter Society. vol. 20, pp. 2-8. Jul. 1975.

* cited by examiner

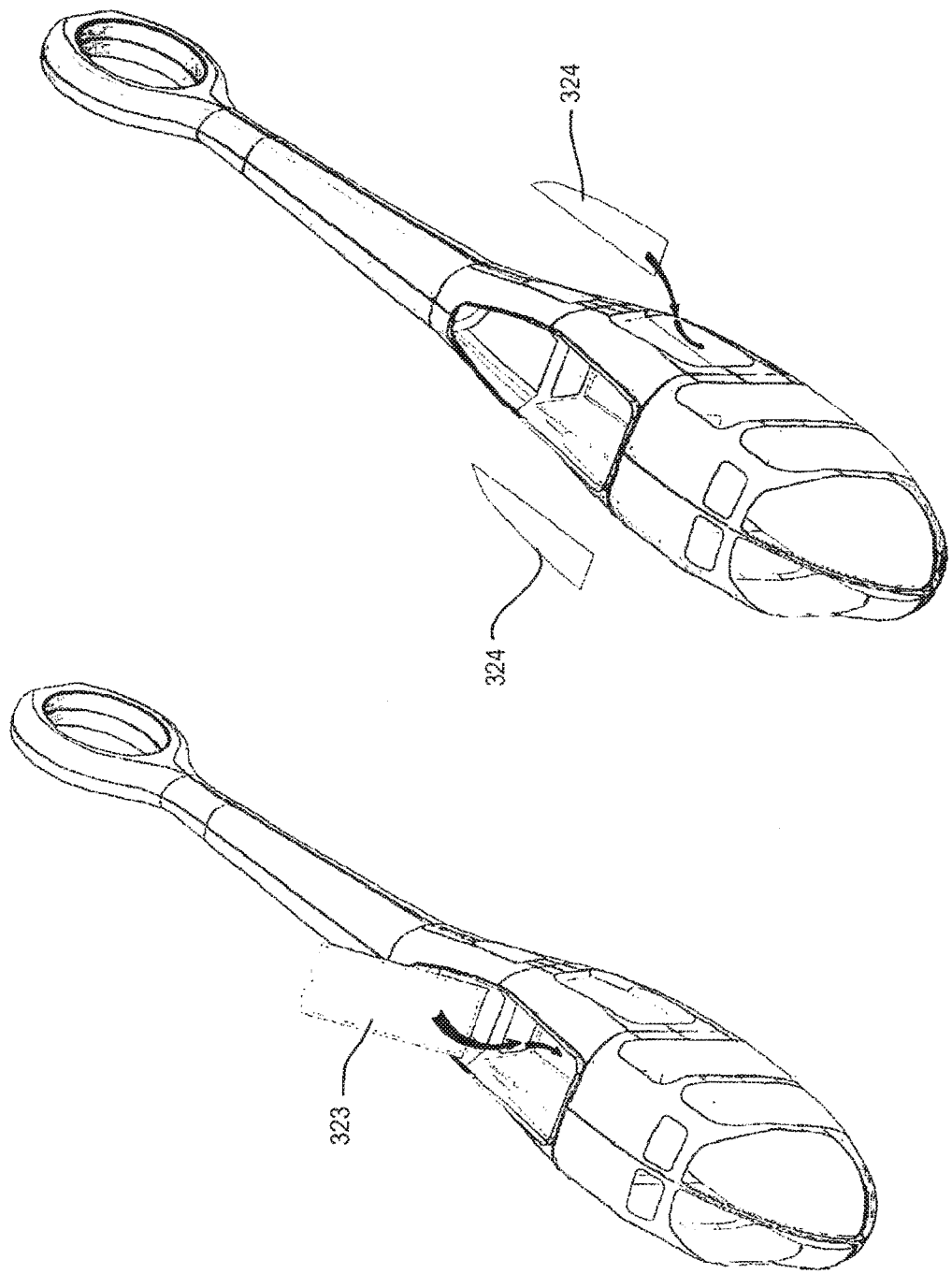

MONOCOQUE HELICOPTER FUSELAGE WITH INTEGRAL TAIL BOOM

CROSS REFERENCE TO RELATED APPLICATIONS

This is a U.S. National Phase of PCT/NZ2012/000087, filed Jun. 7, 2012, which claims priority to New Zealand Application No. NZ 593300, filed Jun. 7, 2011, New Zealand Application No. NZ 593304, filed Jun. 7, 2011, and New Zealand Application No. NZ 593683, filed Jun. 22, 2011, each of which is hereby incorporated by reference in the present disclosure in its entirety.

FIELD OF THE INVENTION

The present invention relates to aircraft structure and in particular to composite aircraft structure.

BACKGROUND TO THE INVENTION

Prior art helicopter supporting structures and framework comprises materials such as wood, aluminium, titanium, chrome molybdenum steel tubing and magnesium alloys. Fabrication and manufacturing of helicopter structures are based around the extensive use of special jigs and frames and certified holding fixtures where floors and jigs, frames and fixtures are frequently calibrated. Such installations have inherent disadvantages including that they are fixed in a location and are not mobile.

The prior art fuselage fabrication and manufacturing process requires the fuselage to be constructed by first assembling internal components and working outward. The prior art method of constructing a helicopter begins by identifying a starting location or part such as a central floor panel. The internal structure of the fuselage is then added systematically around that starting location by adding sub frames and panels. The assembly is then strengthened by riveting or bolting adjoining sub frames and panels to form a skeleton. Once all of the internal structure has been completed the fuselage skeleton is enclosed with a skin that is either riveted or bolted into place, usually by direct attachment to the skeleton. When the primary structure of the fuselage is completed and the fuselage is structurally sound it would be removed from the fabrication or manufacturing assembly jig.

Traditional helicopter fuselage manufacturing has numerous disadvantages. One disadvantage is that construction is extremely labour intensive. The completed fuselage has a vast number of individual parts, each requiring prior fabrication. To track and assemble these parts requires a skilled work force. Further, the fabrication jigs have long set-up times and long breakdown times. Production of helicopter fuselage in traditional manner is very expensive.

A further disadvantage to traditional helicopter manufacturing is the finished external surface of the helicopter fuselage covered in a mass of domed rivet heads. This type of finish is both unattractive and results in high drag penalties. Significant materials cost and time is associated with the use of flush head rivets in the outside skin of the fuselage to remove the drag penalty.

A further disadvantage to traditional helicopter fuselage fabrication using sheet metal panels to form the outer skin of the fuselage is the difficulty in achieving a smooth and thus aerodynamically favourable shape.

A further disadvantage to traditional helicopter fuselage fabrication is that door and window openings are typically hand finished. Finishing by hand results in no two door or window openings being the same. Each window or door therefore requires individual shaping, usually by hand, to ensure a fitment that allows closure without gaps.

A further disadvantage to traditional helicopter fuselage manufacturing using riveted structures and thus lapped joints is the ingress of moisture. This moisture becomes trapped and corrosion will ensue. Corrosion can lead to structural failure.

A prior art method of attaching empennage appendages to a fuselage is with a mechanical fastening such as rivets, screws or bolts. Mechanical fastenings such as riveted joints or bolted joints are known to be labour intensive and require the use of special fixtures and tooling jigs.

A disadvantage associated with use of mechanical fastenings to secure such appendages is that each of the adjoining surfaces must have a plurality of holes formed for the fastening to pass though. Such holes can cause weakening of the structure and may contribute to a point of structural failure. To mitigate the risk of structural failure such methods of fastening often require regular maintenance checks to ensure structural integrity is maintained, particularly for any cracks that may be propagating between adjacent holes.

Mechanical fastenings have a further disadvantage in that substantial damage may be caused to an aircraft by tearing the surrounding material should a secured appendage be struck by some external object.

Mechanical fastenings have a further disadvantage when attaching to curved surfaces together. The mismatch in shapes between the curved surface and the generally flat fastener may create undue stress on a location immediate to the fastener.

A further disadvantage is that mechanically fastened surfaces or riveted surfaces are prone to sealing issues where moisture can ingress or be trapped.

A further disadvantage is that mechanically fastened surfaces are prone to various types of corrosion. Filiform, intergranular and surface corrosion can form between mechanically fastened surfaces. Often, corrosion in these areas goes undetected even with periodic maintenance, dismantling and inspections and can result in catastrophic failure of the fastening or region proximate the fastening.

Traditionally helicopter crew and passenger seats have been inbuilt structures with the helicopter fuselage. Later years have seen crew and passenger seats evolve into stand-alone assemblies for the forward seats and foldaway seats for the rear passengers. Certification standards require the inclusion of a crashworthy seat for all occupants of the helicopter.

More recently since the introduction of new certification rules, seats in newly certified helicopters are required to be "Crashworthy" meeting certain design parameters of maximum load factors, inertial forces, and reactions between occupant, seat, and safety belt or harness corresponding with the applicable flight and ground load conditions, including the emergency landing conditions of the category in which certification is sought.

As a result there have been several newly design crashworthy seats installed into helicopters as new helicopter designs or retrofits to older helicopter designs. These new seat designs incorporate designs of shock absorber, collapsing lever mechanisms, brake, energy absorbing foams, and collapsible metal structures.

One seat design in the prior art for meeting the crashworthy seat standard is known as a stroking seat mechanism. Disadvantages of the stroking seat mechanism include the requirement for regular inspection and servicing, corrosion protection for metal surfaces, inadvertent jamming of the seat action and injuries to limbs that occur during the stroke of seat.

Another design in the prior art for meeting the crashworthy seat standard is known as a braking seat mechanism. Disadvantages of this seat mechanism include the friction pad loosing preload over time and the regular requirement for inspection and readjustment, the metal frame requires corrosion protection, inadvertent jamming of the seat action and injuries to limbs that occur during the stroke of seat.

Another design in the prior art for meeting the crashworthy seat standard is an aluminium sheet metal box design. Disadvantages of this seat mechanism include allowing the occupant to fall through the seat pan into the seat base. While the occupant may survive the crash, evidence has shown the occupant is subsequently trapped in the seat base and unable to escape the crashed aircraft.

In this specification, where reference has been made to external sources of information, including patent specifications and other documents, this is generally for the purpose of providing a context for discussing the features of the present invention. Unless stated otherwise, reference to such sources of information is not to be construed, in any jurisdiction, as an admission that such sources of information are prior art or form part of the common general knowledge in the art.

It is an object of the present invention to provide a solution which overcomes or at least ameliorates at least one of the abovementioned disadvantages or which at least provides the public with a useful choice.

Other objects of the invention may become apparent from the following description which is given by way of example only.

SUMMARY OF THE INVENTION

In one aspect the invention relates to a primary flight structure consisting of a load bearing composite shell defining at least the exterior of a fuselage, the fuselage defining at least a central fuselage section and tail boom, wherein the central fuselage section is adapted enclose at least one of an engine or drive train.

Preferably the tail boom has attached or is adapted to have attached at least one of an empennage, fins, or tail rotor mechanism.

Preferably the empennage is adapted to support a ducted fan tail rotor assembly, horizontal and vertical stabilisers.

Preferably the tail boom is adapted to have attached an empennage to thereby form a monocoque structure.

Preferably a forward section of the fuselage adapted to house one or more occupants and flight controls.

Preferably the composite primary flight structure further comprises a central section and forward section of the fuselage delineates at least one of a door, window or hatch opening.

Preferably the structure delineates an opening located in an upper region of the fuselage surface, the opening adapted to allow at least one of an engine or main rotor gearbox or drive train module to be at least partly inserted into the fuselage.

Preferably the composite primary flight structure further comprises at least two members components extending between at least an upper and lower internal surface of the fuselage.

Preferably the members provide at least one attachment point for at least one of an engine or main rotor gearbox or drive train module, or at least one attachment point for a frame assembly to which at least one of an engine or main rotor gearbox or drive train module are adapted to be attached.

Preferably the composite primary flight structure further comprises at least two members extending at least between side internal surfaces of the fuselage and transversely to the at least two beam components.

Preferably at least one of the members is adapted to transfer load created by at least one of an engine or main rotor gearbox or drive train module to the composite shell.

Preferably at least one of the members is arranged to at least partially create an enclosed space in which one or more fuel cells can be located.

Preferably the members are adapted to create a structure attachable to the internal surface of the composite shell such that the structure least partially absorbs aircraft impact energy and diverts energy away from the enclosed space.

Preferably at least two members further comprise an integrally formed and forward protruding member adapted to extend from the central fuselage section to the forward section, the protruding member having a lower region adapted to attach to a lower internal surface of the composite shell and an upper region adapted to support a cabin floor panel.

Preferably the forward section of the fuselage and the cabin floor panel at least partly define a cabin space such that seating for occupants and flight controls can be located or referenced.

Preferably the cabin floor is supported by the forward protruding member and a plurality of structural members, the structural members adapted to extend between the lower side of the cabin floor panel and the internal surface of the lower region of the composite shell.

Preferably the structural members are adapted to attach to the cabin floor panel and the internal surface of the composite shell.

Preferably the structural members comprise a first set of members and second set or members and the first set of members are adapted to extend substantially perpendicular to the second set of members such that the structural members together, when combined, are adapted to form a lattice structure extending between the cabin floor panel and the internal surface of the composite shell.

Preferably the cabin space is further adapted to allow a plurality of seats, flight controls and occupant restraints to be located.

Preferably the composite shell comprises a laminate, the laminate comprising a plurality of fabric layers.

Preferably the plurality of fabric layers comprise a first layer of continuous filament mat, a first layer of carbon and KEVLAR composite, a layer of unidirectional carbon fibre, a second layer of carbon and KEVLAR composite, a second layer of continuous filament mat and wherein the laminate is, or is adapted to be infused with a cured or curable resin.

Preferably the laminate further comprises additional laminates and/or core filler material including SORIC.

Preferably the laminate further comprises a layer of carbon unidirectional fabric between the first and second layers.

Preferably the laminate further comprises a layer of carbon double bias fabric between the first and second layers.

Preferably the laminate further comprises a filler layer between the first and second layers.

Preferably the layer of carbon double bias fabric comprises a plurality of layers of carbon double bias fabric, including a plurality of layers that span a surface of an upper region of the central fuselage section to a surface of an upper section of the tail boom, a plurality of layers that span the upper region of the central fuselage surface section to a middle and a lower surface section of the tail boom, and a plurality of layers that span between a lower region of the central fuselage section to at least some way into the lower surface of the tail boom region.

Preferably the unidirectional carbon fibre fabric is approximately 200 g/mm$^2$.

Preferably at least some of the support fabrics are approximately 200 mm to 300 mm wide.

Preferably the support fabrics are integrated within the laminate layers of the fuselage.

Preferably the continuous filament mat layers are approximately 300 g/mm$^2$.

Preferably the carbon and KEVLAR composite layers are approximately 190 g/mm$^2$.

Preferably the filler layer is approximately 2 mm thick.

Preferably the outer surface layer is formed as a substantially smooth and substantially continuous surface that extends through at least the central fuselage section to the tail boom.

In another aspect the invention relates to an enclosure adapted to provide protection for one or more fuel cells consisting in at least four upstanding panel members spanning between an upper and lower internal surface of a substantially enclosed composite fuselage or outer shell of a flight structure, at least two panel members having a surface extending laterally relative to the interior of the fuselage or outer shell of the flight structure interior and attaching to the internal surface of the fuselage at least in an upper and lower region thereof, and at least two panel members extending longitudinally to the interior of the fuselage or outer shell of a flight structure interior and attaching to the interior surface of the fuselage at least in an upper and lower region thereof, the panel members defining an enclosed space.

Preferably each of the fuselage or outer shell and panel members comprise a composite laminate structure.

Preferably the enclosure further comprises a floor member attached to a lower region of the enclosed space.

Preferably the upper region of the panel members is adapted to support at least one of an engine or main rotor gearbox or drive train module, or at least a frame assembly to which at least one of an engine or main rotor gearbox or drive train module are attachable.

Preferably the enclosure is adapted to support at least one fuel cell.

Preferably at least one of the panel members has an aperture through which a fuel cell can be inserted.

Preferably the fuselage or outer shell and panel members together form a structure such that, when subjected to an impact load, divert impact energy away from the enclosed space.

In another broad aspect the invention consists in a method of forming a helicopter fuselage having at least a centre section and tail boom section, the method consisting of providing at least two moulds, a first moulds having an inner shape substantially corresponding to a port section of a desired outer fuselage shell profile and a second mould having an inner shape substantially corresponding to a starboard section of a desired outer fuselage shell profile, applying a plurality of fabric layers into each of the first and second mould to form a port fuselage section and a starboard fuselage section, and infusing a resin into the layers of fabric to create a composite structure.

Preferably the step of applying a plurality of fabric layers into the mould comprises applying a first layer of CFM, applying a first layer of carbon and KEVLAR composite fabric, applying a layer of CU, applying a second layer of carbon and KEVLAR composite fabric, applying a second layer of CFM.

Preferably the method further comprises applying additional laminates and/or a core material including SORIC.

Preferably the step of applying a plurality of fabric layers into the mould further comprises a layer of CU between the first and second layers.

Preferably the step of applying a plurality of fabric layers into the mould the laminate structure further comprises a layer of CDB between the first and second layers.

Preferably the method further comprising aligning each of the first and second moulds together, such that the port section and starboard section of the fuselage are adjacent.

Preferably each mould section has one or more of an alignment marker or datum, the method further comprising aligning each of the alignment markers or datums.

Preferably the method further comprising applying a plurality of fabric layers across the adjoining port section and starboard section of the fuselage.

Preferably the method further comprising providing a plurality of moulds corresponding to desired internal fuselage structure.

Preferably the method further comprises the steps of allowing the resin to cure and removing the composite structure from the mould.

In another broad aspect the invention consists in a method of building a helicopter comprising the following steps: providing a fuselage outer skin or shell, the shell comprising at least a fuselage centre section and tail boom, the fuselage outer skin or shell delineating a plurality of openings and defining a substantially enclosed space, inserting a plurality of members into the fuselage through at least one of the plurality of openings.

Preferably the method further comprises assembling the plurality of members inside the fuselage outer skin or shell to form an internal structure.

Preferably the method further comprises inserting a plurality of floor panels into the fuselage through at least one of the openings.

Preferably the method further comprises bonding the plurality of members to either the inner surface of the fuselage outer skin or shell, other members and floor panels, or a combination thereof.

Preferably the step of bonding comprises applying fabric to overlap regions of the proximate regions of the adjoining members and infusing the fabric with resin to form a composite structure.

Preferably the method further comprises arranging the plurality of members in the centre section inside the fuselage to define an enclosed space.

Preferably the fuselage further forms a forward section of a fuselage adaptable to enclose a cabin for housing a pilot, passengers and flight controls.

Preferably the plurality of openings include either a door, a window or a hatch opening.

Preferably the method further comprises attaching an empennage or any number of flight stabilisation appendages to the tail boom.

Preferably the tail boom and empennage define a monocoque structure.

Preferably the empennage is adapted to support a ducted fan tail rotor assembly, horizontal and vertical stabilisers.

Preferably the method further comprises inserting an engine or engine supporting frame into the fuselage through one of the openings.

Preferably the method further comprises attaching the engine or engine supporting frame to at least one of the members.

Preferably the method further comprises inserting at least one fuel cell into the enclosed space within the fuselage through one of the openings.

In another board aspect the invention consists in a crashworthy seat assembly for an aircraft comprising: a seat base component, the seat base having a lower surface adapted to attach to the aircraft, a seat pan component wherein the seat pan is adapted to attach to the top of the seat base, the seat component formed of a composite laminate structure.

Preferably the seat base is of a form such that when subjected to an impact, the seat base crushes to absorb impact energy.

Preferably the seat base component having a base wall and four side walls, the side walls comprising substantially continuous inner and outer layers that each extend around the perimeter of the seat base, the side walls further comprising an intermediate layer, the intermediate layer comprising a plurality of discrete wall sections disposed between the inner and outer layers such that a crushing region is defined at or near the region where each wall transitions to the next.

Preferably the base wall and the side walls have a region of overlap, wherein the region of overlap is provide by either the sidewalls extending into the base wall, or the base wall extending into the side wall, or both.

Preferably the region of overlap of the side layers extend approximately 50 mm across the base surface and the base layers extend approximately 30 mm up the side surfaces.

Preferably the seat base further comprises a upper layer extending around the upper region of the four side walls.

Preferably the upper support layer is a continuous filament fabric of approximately 450 g/m2.

Preferably the seat component comprising a seat back and seat pan, the seat back and seat pan formed from a plurality of substantially continuous layers.

Preferably the seat is an all composite upper seat comprising a seat pan and seat back structurally bonded to a crushable composite seat base.

Preferably the base wall is adapted to be fastened to an aircraft cabin floor.

Preferably the base wall comprises one or more additional layers of carbon double bias fabric.

Preferably the base wall of carbon double bias fabric is approximately 400 g/mm$^2$.

Preferably the base wall of carbon double bias fabric is at least 75 mm wide.

Preferably the base wall and four side walls define an enclosed internal space, the internal space adapted to house an energy absorbing material, or luggage.

Preferably the energy absorbing foam is CONFOR CF45, CONFOR CF47 or similar.

Preferably at least one of the side walls has an opening providing access to the enclosed space, the opening having a support layer disposed around the periphery thereof.

Preferably the support layer is a continuous filament mat fabric of approximately 450 g/m2.

Preferably the rearward side wall extends upward at of the seat base such that additional support is provided to the back section of the seat.

Preferably the inner and outer layers are as carbon and KEVLAR fabric 0/90, bidirectional or coaxial type fabric.

Preferably the inner and outer layers are a Carbon and KEVLAR fabric of 180 g/m2.

Preferably the intermediate layers are a continuous filament fabric of approximately 450 g/m2.

Preferably the seat pan component has a substantially upstanding seat back portion integral with a substantially flat seat base portion, wherein the seat pan component is constructed from alternating layers of fabric materials.

Preferably at least one of the fabrics is a flow medium.

Preferably at least one of the fabrics provides mechanical strength.

Preferably at least one of the fabrics prevents explosive failure of the other fabrics when subjected to an impact load.

Preferably the alternating fabrics are Carbon and KEVLAR fabric and continuous filament.

Preferably a core material spaces a portion of the layers of fabric apart.

Preferably the layers of fabric materials comprise: a first surface layer of carbon and KEVLAR composite fabric of approximately 180 g/mm$^2$, a second layer continuous filament mat of approximately 300 g/mm$^2$, a third layer of laterally spaced portions of carbon unidirectional fabric, each approximately 100 mm in width and approximately 300 g/mm$^2$, a fourth layer of carbon and KEVLAR composite fabric of approximately 180 g/mm$^2$, a fifth layer of continuous filament mat of approximately 300 g/mm$^2$, a sixth of continuous filament mat of approximately 300 g/mm$^2$, a seventh layer of carbon and KEVLAR composite fabric of approximately 180 g/mm$^2$, a plurality of laterally spaced eighth layers of carbon unidirectional fabric of approximately 300 g/mm$^2$, a ninth layer of continuous filament mat of approximately 300 g/mm$^2$, and a tenth layer of carbon and KEVLAR composite fabric of approximately 180 g/mm$^2$.

Preferably the layers of fabric materials further comprise a layer of core material disposed between the fifth and sixth layers.

Preferably the core material comprises two laterally spaced members.

Preferably the core is a PVC foam material or similar.

Preferably the width of each eighth layer of fabric is approximately 50 mm.

Preferably there are at least three pairs of laterally spaced eighth layers.

In a further broad aspect the invention consists in a fastening providing a mechanical and chemical attachment between at least a first and second opposing surface, each of the surfaces having a plurality of holes extending from an opposing side to a non opposing side, the fastening comprising an adhesive layer located between the first and second surface and extending through at least some of the plurality of holes, the adhesive layer having a head located on each non opposing side of the first and second surface.

Preferably the adhesive is a methyl methacrylates based epoxy adhesive.

Preferably the adhesive is at least one of ITW PLEXUS MA530, MA550, CLICK BOND, PERMABOND, PARSON, ITW RAMSET A7.

Preferably the adhesive has a viscosity of approximately of 150,000 cps.

Preferably the adhesive is mixed with a fibre additive.

Preferably additive is at least one of carbon, KEVLAR or a composite glass fibre.

Preferably the gap between each opposing surface is not greater than 10 mm.

Preferably the gap between each opposing surface is approximately 3 mm.

Preferably the fastening hole size is approximately 3 to 5 mm

Preferably the fastening the hole size is approximately 4 mm.

Preferably the fastening holes are spaced approximately 25 mm between hole centres.

Preferably the fastening holes are located first relative to an outside edge of a surface and spaced inward.

Preferably the fastening holes located closest to an outside edge of a surface are approximately 10 mm from that outside side edge.

Preferably at least one of the fastening surfaces is part of an aircraft structure or fuselage.

Preferably at least one of the fastening surfaces is an appendage adapted to be attached to an aircraft structure or fuselage.

In another broad aspect the invention consists in a method of joining two surfaces comprising providing at least two opposing surfaces to be joined, providing a plurality of holes in each surface that extend from an opposing side to a non opposing side, providing a layer of adhesive between the opposing surfaces, wherein the adhesive is of a type that chemically or mechanically bonds to the surfaces, the adhesive being of a liquid form or at least paste, positioning the surfaces together such that the adhesive flows or is otherwise forced through at least some of the plurality of holes from the opposing side to a non opposing side, and the adhesive forming a head on the non opposing side, and curing the adhesive.

Preferably a portion the adhesive forms a composite rivet.

Preferably the method further comprises mixing a fibre additive to the adhesive.

Preferably the step of positioning the surfaces together comprises positioning the surfaces not greater than 10 mm apart.

Preferably the step of positioning the surfaces together comprises positioning the surfaces approximately 3 mm apart.

Preferably a method providing a plurality of holes in each surface comprises providing a size of approximately 3 to 5 mm Preferably a method providing a plurality of holes in each surface comprises providing a size of approximately 4 mm.

Preferably a method wherein the holes are spaced approximately 25 mm between hole centres.

Preferably the holes are located first relative to an outside edge of a surface and spaced inward.

Preferably the holes located closest to an outside edge of a surface are approximately 10 mm from that outside side edge.

In another aspect the invention consists in an aircraft surface with appendages attached by a fastening mechanism comprising providing a mechanical and chemical attachment between the aircraft surface and appendage, the mechanism comprising a mechanical and chemical attachment between at least a first and second opposing surface, each of the surfaces having a plurality of holes extending from an opposing side of each of the aircraft surface and appendage to a non opposing side, comprising an adhesive layer located between the first and second surface and extending through at least some of the plurality of holes, the adhesive layer, when cured, having a head located on each non opposing side of the aircraft surface and appendage surface.

Preferably the adhesive is a methyl methacrylates based epoxy adhesive.

Preferably the adhesive is at least one of ITW PLEXUS MA530, MA550, CLICK BOND, PERMABOND, PARSONS, ITW RAMSET A7.

Preferably the adhesive has a viscosity of approximately of 150,000 cps.

Preferably the adhesive is mixed with a fibre additive.

Preferably an additive is at least one of carbon, KEVLAR or a composite glass fibre.

Preferably the gap between each opposing surface is not greater than 10 mm.

Preferably the gap between each opposing surface is approximately 3 mm.

Preferably the hole size is approximately 3 to 5 mm

Preferably the hole size is approximately 4 mm.

Preferably the holes are spaced approximately 25 mm between hole centres.

Preferably the holes are located first relative to an outside edge of a surface and spaced inward.

Preferably the holes located closest to an outside edge of a surface are approximately 10 mm from that outside side edge.

The following embodiments may relate to any of the above aspects.

Other aspects of the invention may become apparent from the following description which is given by way of example only and with reference to the accompanying drawings.

As used herein the term "and/or" means "and" or "or", or both.

As used herein "(s)" following a noun means the plural and/or singular forms of the noun.

It is intended that reference to a range of numbers disclosed herein (for example, 1 to 10) also incorporates reference to all rational numbers within that range (for example, 1, 1.1, 2, 3, 3.9, 4, 5, 6, 6.5, 7, 8, 9 and 10) and also any range of rational numbers within that range (for example, 2 to 8, 1.5 to 5.5 and 3.1 to 4.7) and, therefore, all sub-ranges of all ranges expressly disclosed herein are hereby expressly disclosed. These are only examples of what is specifically intended and all possible combinations of numerical values between the lowest value and the highest value enumerated are to be considered to be expressly stated in this application in a similar manner.

In this specification where reference has been made to patent specifications, other external documents, or other sources of information, this is generally for the purpose of providing a context for discussing the features of the invention. Unless specifically stated otherwise, reference to such external documents is not to be construed as an admission that such documents, or such sources of information, in any jurisdiction, are prior art, or form part of the common general knowledge in the art.

The term "comprising" as used in this specification means "consisting at least in part of". When interpreting statements in this specification which include that term, the features, prefaced by that term in each statement or claim, all need to be present but other features can also be present. Related terms such as "comprise" and "comprised" are to be interpreted in the same manner.

The term "composite" as used in this specification means to a composition of two or more materials including a matrix and reinforcement or at least one of the matrix or the reinforcement. The term "matrix" means or includes a polymer material often called or interchangeably referred to as a resin or resin solution. The term "reinforcement" means or includes a fabric or fibrous material including one or more constituents.

To those skilled in the art to which the invention relates, many changes in construction and widely differing embodiments and applications of the invention will suggest themselves without departing from the scope of the invention as defined in the appended claims. The disclosures and the descriptions herein are purely illustrative and are not intended to be in any sense limiting.

BRIEF DESCRIPTION OF THE DRAWINGS

The invention will now be described by way of example only and with reference to the drawings in which:

FIG. 21 shows a floor panel that can be inserted through the inspection hatch delineated by the top surface of the fuselage and optionally joined to the keel beams.

FIG. 22 shows optional panel adapted to be located on the lower outer floor regions of the central fuselage to facilitate a flat surface for cargo storage.

DETAILED DESCRIPTION OF THE INVENTION

Figure 1:
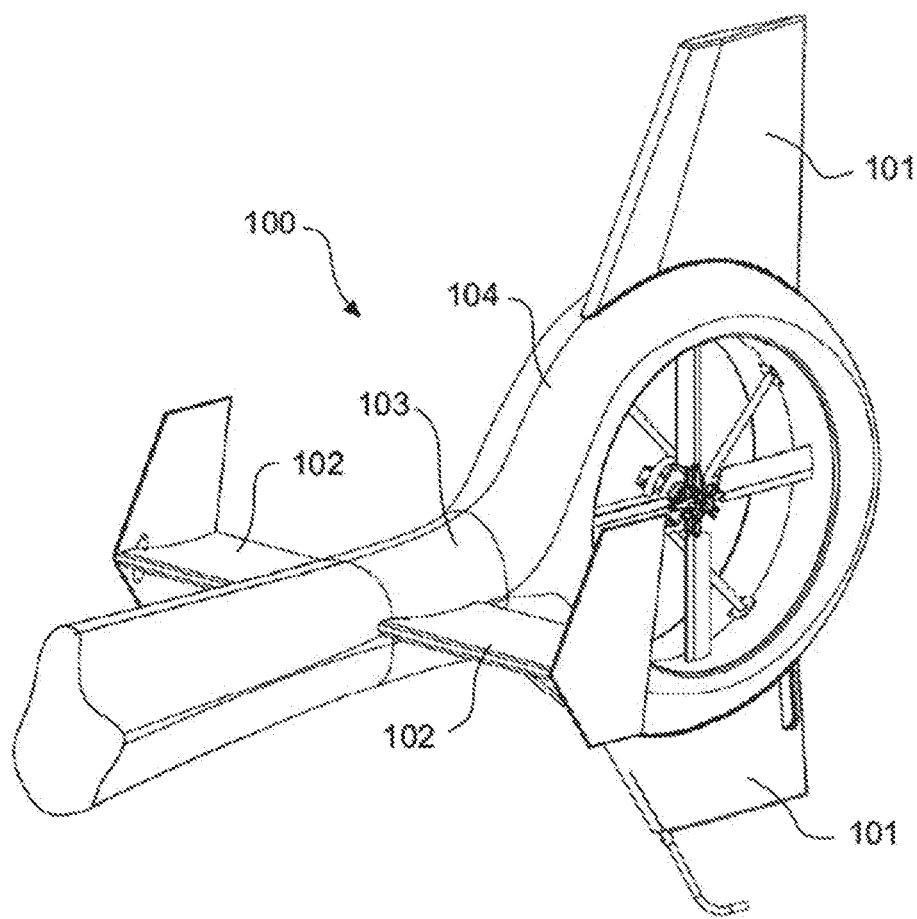
FIG. 1 shows a typical empennage of a helicopter aircraft having one or more vertical stabiliser fins.

FIG. 1 shows a typical empennage of a helicopter aircraft 100 having one or more vertical stabiliser fins 101 and one or more horizontal stabiliser fins 102. Stabilising fins are primarily required on air craft to provide aerodynamic stability but may provide secondary functions such as housing devices such as sensors and lights or mechanisms used for aircraft flight control.

A prior art method of attaching empennage appendages such as fins 101, 102 to a fuselage or aircraft such as the helicopter tail boom 103 and fan duct structure 104 is with the use of a mechanical fastening such as rivets, screws or bolts. Mechanical fastenings such as riveted joints or bolted joints are known to be labour intensive and require the use of special fixtures and tooling jigs.

A disadvantage associated with use of mechanical fastenings to secure such appendages is that each of the adjoining surfaces must have a plurality of holes formed for the fastening to pass though. Such holes can cause weakening of the structure and may contribute to a point of structural failure. To mitigate the risk of structural failure such methods of fastening often require regular maintenance checks to ensure structural integrity is maintained, particularly for any cracks that may be propagating between adjacent holes.

Mechanical fastenings have a further disadvantage in that substantial damage may be caused to an aircraft by tearing the surrounding material should a secured appendage be struck by some external object.

Mechanical fastenings have a further disadvantage when attaching to curved surfaces together. The mismatch in shapes between the curved surface and the generally flat fastener may create undue stress on a location immediate to the fastener.

A further disadvantage is that mechanically fastened surfaces or riveted surfaces are prone to sealing issues where moisture can ingress or be trapped.

A further disadvantage is that mechanically fastened surfaces are prone to various types of corrosion. Filiform, intergranular and surface corrosion can form between mechanically fastened surfaces. Often, corrosion in these areas goes undetected even with periodic maintenance, dismantling and inspections and can result in catastrophic failure of the fastening or region proximate the fastening.

Figure 2:
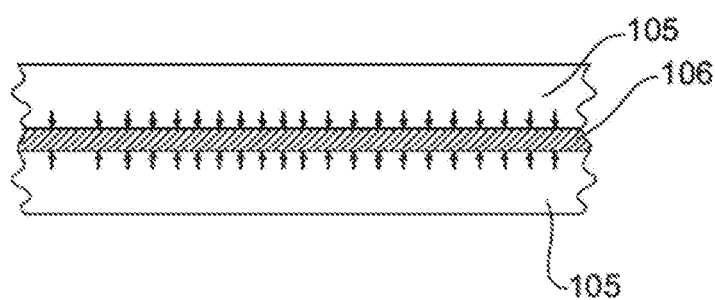
FIG. 2 shows two surfaces with an adhesive located between them.

One way to fasten empennage appendages to a fuselage or aircraft structure and overcome the problem of cracking which is associated with using traditional mechanical fasteners is by the use of a chemical bond such as methyl methacrylates or a mechanical adhesive. FIG. 2 shows two surfaces 105 with an adhesive 106 located between them. Such adhesives are initially a liquid or paste to allow them to flow between the surfaces 105 before chemically reacting with the surfaces 105 and curing to create a rigid bond. Each of the surfaces 105 should have a substantially coherent shape to ensure the best possible bond, but are not required to be a flush fit. When the adhesive 106 is applied to the surfaces 105 the assembly is positioned together in the direction of the indicating arrows and the adhesive is allowed to cure. The adhesive typically requires a chemical exothermic reaction for cure.

A disadvantage of using a chemical bond to join an appendage to an aircraft structure is that such bonds typically provide only shear strength. The chemical bond may still be prone to failure if subjected to a tensile pressure or a peel pressure should a secured appendage be struck by some external object.

One preferred embodiment of the invention relates to an attachment or method of attaching appendages to a fuselage or aircraft structure which overcomes or at least ameliorates at least one of the abovementioned disadvantages or which at least provides the public with a useful choice. In preferred embodiments the attachment or attachment method is used to attach empennage appendages to an airframe, but may also include attaching various other items including brackets and antennas.

Figure 3:
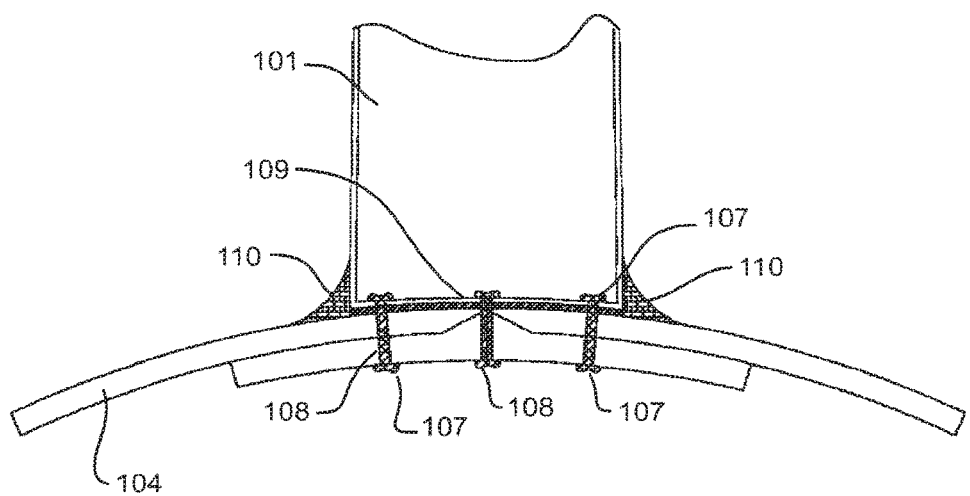
FIG. 3 shows a fin attached to a section of empennage using a coupling member.

FIG. 3 shows a fin 101 attached to a section of empennage 104 using a coupling member 108. The coupling member 108 is an integral combination of a mechanical fastening provided by a head 107 and a chemical bond provided by a cured adhesive 109.

To couple the surfaces it is preferable, but not necessary that each of the surfaces are substantially flush fitting with one another or at least have a substantially coherent shape.

Figure 4:
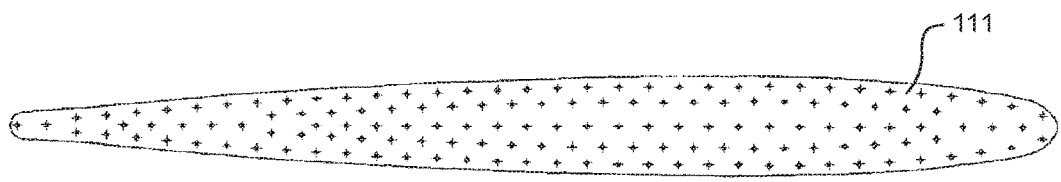
FIG. 4 shows an end view of a fin to be attached to an empennage having a plurality of holes.
Figure 5:
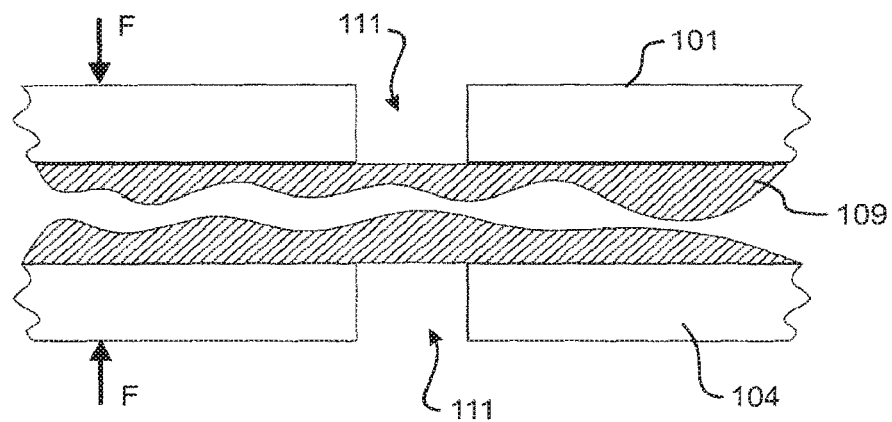
FIG. 5 shows the adhesive between upper opposing surface that may be, for example, a tail fin and lower opposing surface that may be, for example, an empennage.

Preferably the coupling member 108 is formed by at least some of the following steps:

1. The area the opposing surfaces to be joined is marked or otherwise noted.
2. The area the opposing surfaces to be joined has a plurality of holes formed in each surface. The holes are not required to be aligned. FIG. 4 shows an end view of a fin to be attached to an empennage having a plurality of holes 111.
3. A portion of adhesive is applied between each of the opposing surfaces. FIG. 5 shows the adhesive 109 between upper opposing surface that may be, for example, a tail fin 101 and lower opposing surface that may be, for example, an empennage 104. The adhesive may be a glue or resin and may include fibres or be a fibre composite.
4. The opposing surfaces 101, 104 are then positioned relative to one another in the direction indicated F. The positioning of the opposing surfaces 101, 104 causes adhesive 109 to be forced through holes 111. As the adhesive flows through holes 111 surface attraction (via the Coandă effect) causes the flow of the adhesive to follow the contour of the surface through the hole and, having passed through the hole 111, flows radially outward.

Adhesive flowing beyond the extremities of the fin 101 may be covered or otherwise shaped to provide a smooth and aerodynamically favourable transition 110 between the fin 101 and empennage 104.

Figure 6:
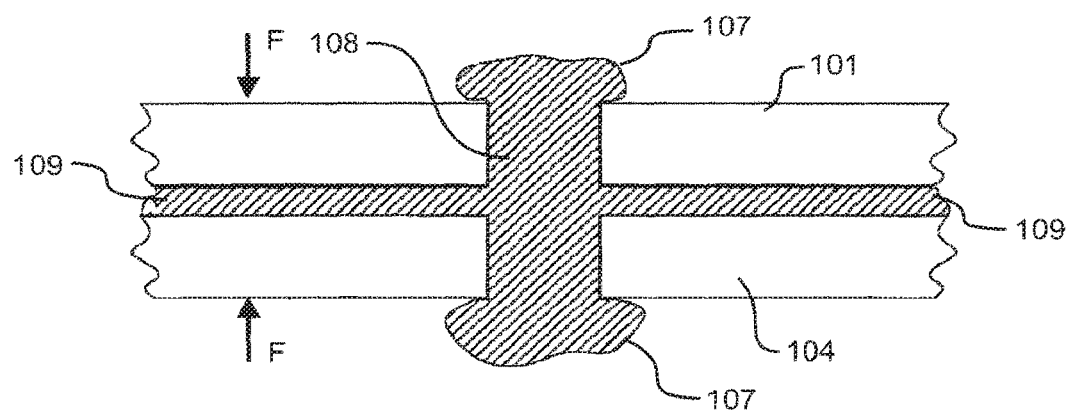
FIG. 6 shows the adhesive forms a head on the outward side of the surfaces.

The adhesive 109 forms a head 107 on the outward side of the surfaces as shown in FIG. 6. When the adhesive is cured the head 107 creates a coupling member 108. The coupling member 108 provides a mechanical fastening while the surfaces and resultant assembly also enjoy a chemical bond. The coupling member provides strength to resist both shear forces and tension forces by a greater measure than mere bonding or strictly mechanical fasteners would otherwise provide.

Forming the coupling member to join two surfaces is particularly useful when the surfaces are formed by a substrate and resin. The adhesive 109 may be the same or similar material to the resin such that the assembly, when cured, becomes a structure of substantially uniform material.

A further advantage provided by the coupling member 108 is that improves any repair process that may be required to take place, for example, if an appendage is required to be replaced. Replacement may be required due to fatigue weakening the appendage or by damage from an inadvertent strike.

The damaged appendage can be cut from the empennage using any known method and the empennage ground or sanded to reproduce its original shape and contour. Once the empennage has been restored, a new appendage can be prepared and attached to the empennage by forming a new coupling member 108 using the abovementioned process. Any material leftover from old coupling members does not substantially affect the formation of new coupling members.

Preferably the adhesive is ITW PLEXUS MA530 or MA550. However, similar adhesives such as CLICK BOND, PERMABOND, PARSONS, ITW RAMSET A7 or other methyl methacrylates based epoxy adhesives.

Preferably the viscosity of the adhesive is approximately of 150,000 cps.

Optionally, the adhesive is mixed with a fibre additive. Preferably that additive is carbon, or alternatively may be KEVLAR or a composite glass fibre.

Preferably the gap between each positioned surface is not greater than 10 mm. Preferably the gap between each positioned surface is approximately 3 mm gap. Preferably the surfaces and can go up to 10 mm on fairing edges.

The hole size may be 3 to 5 mm and is preferably approximately 4 mm. Preferably the holes are located approximately 25 mm between hole centres. Preferably the holes are located first relative to an outside edge of a surface and worked inward. Preferably the outermost holes are approximately 10 mm from an outer side edge.

Traditionally helicopter crew and passenger seats have been inbuilt structures with the helicopter fuselage. Later years have seen crew and passenger seats evolve into stand-alone assemblies for the forward seats and foldaway seats for the rear passengers. Certification standards require the inclusion of a crashworthy seat for all occupants of the helicopter.

More recently since the introduction of new certification rules, seats in newly certified helicopters are required to be "Crashworthy" meeting certain design parameters of maximum load factors, inertial forces, and reactions between occupant, seat, and safety belt or harness corresponding with the applicable flight and ground load conditions, including the emergency landing conditions of the category in which certification is sought.

As a result there have been several newly design crashworthy seats installed into helicopters as new helicopter designs or retrofits to older helicopter designs. These new seat designs incorporate designs of shock absorber, collapsing lever mechanisms, brake, energy absorbing foams, and collapsible metal structures.

One seat design in the prior art for meeting the crashworthy seat standard is known as a stroking seat mechanism. Disadvantages of the stroking seat mechanism include the requirement for regular inspection and servicing, corrosion protection for metal surfaces, inadvertent jamming of the seat action and injuries to limbs that occur during the stroke of seat.

Another design in the prior art for meeting the crashworthy seat standard is known as a braking seat mechanism. Disadvantages of this seat mechanism include the friction pad loosing preload over time and the regular requirement for inspection and readjustment, the metal frame requires corrosion protection, inadvertent jamming of the seat action and injuries to limbs that occur during the stroke of seat.

Another design in the prior art for meeting the crashworthy seat standard is an aluminium sheet metal box design. Disadvantages of this seat mechanism include allowing the occupant to fall through the seat pan into the seat base. While the occupant may survive the crash, evidence has shown the occupant is subsequently trapped in the seat base and unable to escape the crashed aircraft.

One preferred form of the invention is a crashworthy seat for occupants of the helicopter that overcomes or ameliorates at least one of the abovementioned disadvantages or at least provides the public with a useful choice. Preferably the crashworthy seat also meets current certification requirements for energy absorbing seat designs of 30 G downwards and 18.5 G forwards.

Another aspect of the invention is a seat residing on a mechanism that provides a vertical distance to allow crushing. In an embodiment of the invention the seat is an all composite upper seat comprising a seat pan and seat back structurally bonded to a crushable composite seat base. The seat is intended to be compatibly located in both forward and aft cockpit positions.

Figure 7B:
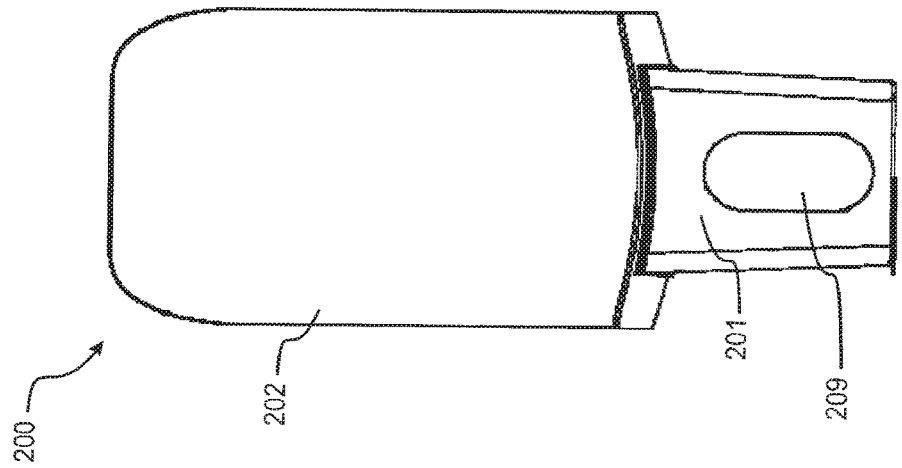
FIGS. 7a and 7b respectively show perspective and front views of an energy absorbing seat assembly for an aircraft, and particularly helicopters.
Figure 7A:
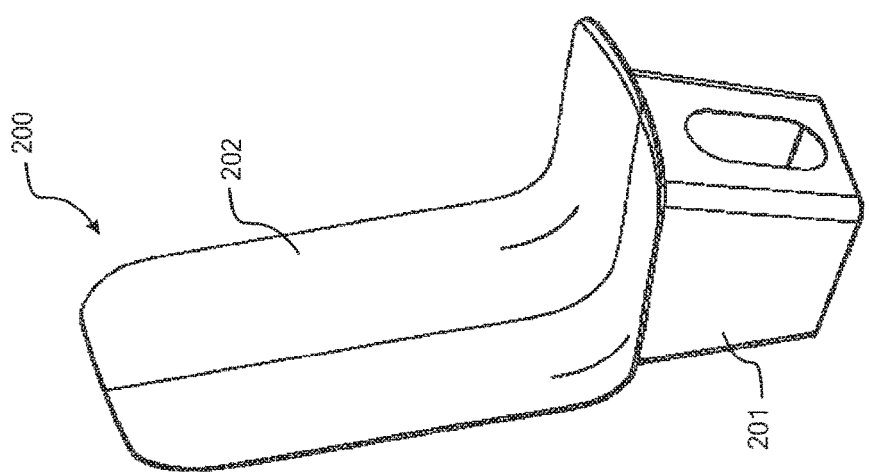

FIGS. 7a and 7b respectively show perspective and front views of an energy absorbing seat assembly 200 for an aircraft, and particularly helicopters. The seat 200 is generally constructed with an upper composite laminate section 202 and a lower composite section 201. Each composite section is constructed with a particular arrangement of fabric layers that are infused and bonded together with a curable resin.

Figure 8:
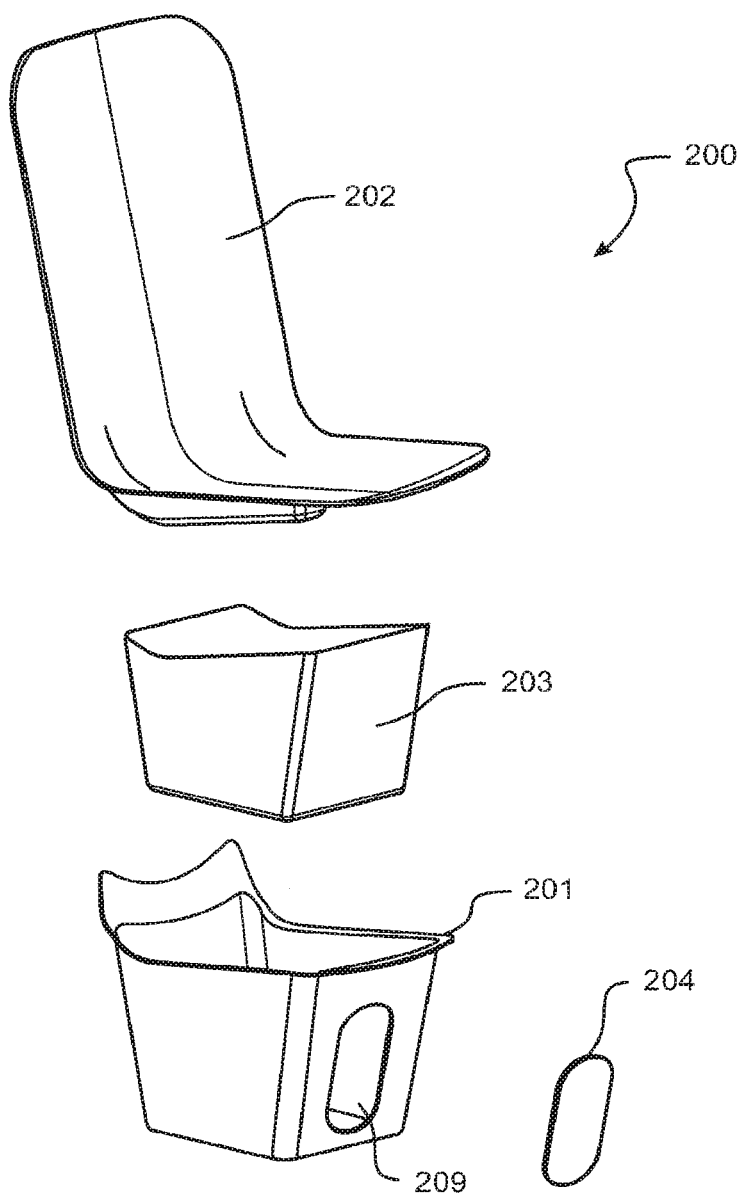
FIG. 8 shows an exploded perspective view of the section of the seat.

The lower composite section 201, or base, is crushable to aircraft impact energy to go at least some way toward mitigating injuries sustainable by the seat occupant during a hard landing or crash. FIG. 8 shows an exploded perspective view of the section of the seat 200. Preferably the upper and lower seat sections are individually assembled and constructed then subsequently joined together. An energy absorbing member 203, such as foam, may be installed into the open central area of the seat base 201 to further improve the impact energy absorption properties of the seat. Preferably the energy absorbing foam is CONFOR CF45, CONFOR CF47 or similar.

In the event energy absorbing characteristics are, for example in an experimental or amateur built aircraft, and the foam 203 is not required, the open central area of the seat base 201 a hatch opening 209 and lid 204 may be provided to allow, for example, the open central area to be used for luggage storage.

In use, of the seat is anchored through the lower composite section 201 to an aircraft cabin floor and is compatible in both forward and aft cabin positions A seat occupant is restrained into the seat in use by a seat belt assembly comprising lap and shoulder belts which may be attached to the seat.

Figure 9:
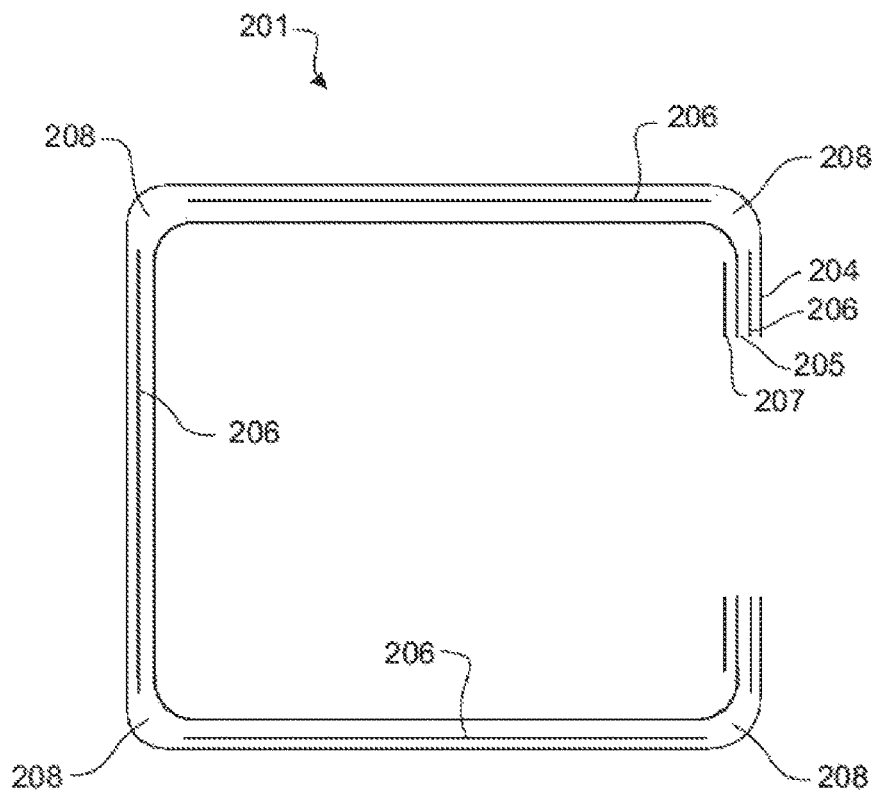
FIG. 9 shows a top cross sectional view of the seat base.
Figure 10:
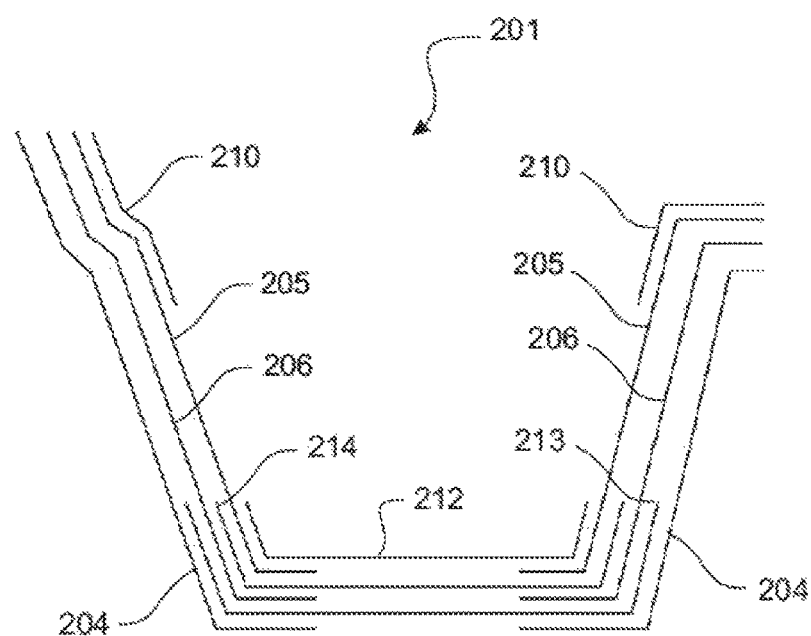
FIG. 10 shows a side cross sectional view of the seat base.
Figure 11:
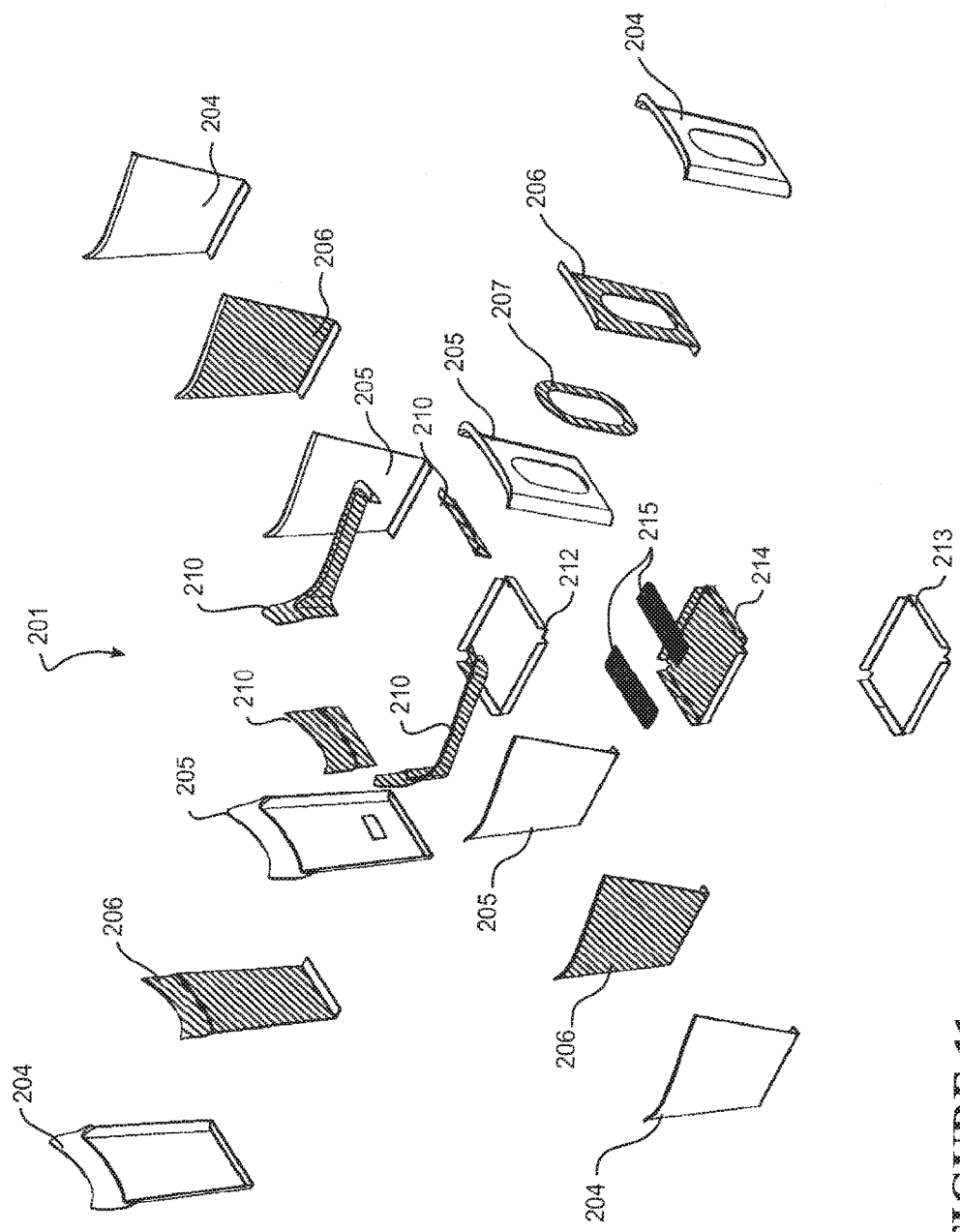
FIG. 11 shows an exploded view of the seat base showing a most preferred arrangement of the structural laminate layer.

The preferred arrangement of fabric layers for the lower composite section or seat base 201 will now be described with reference to FIGS. 9 to 11. FIG. 9 is a top cross sectional view of the seat base 201 and FIG. 10 is a side cross sectional view of the seat base 201. FIG. 11 is an exploded view of the seat base 201 showing a most preferred arrangement of the structural laminate layer. Preferably the seat base is constructed with a plurality of fabric layers which are infused and bonded together with resin to form a composite or matrix.

Preferably the seat base 201 has a side structure with an outer layer of fabric 204 and an inner layer of fabric 205 that extends around the outer periphery. An intermediate layer 206 is located between the inner and outer periphery layers 204, 205 on each of the front, back and side surfaces. When a hatch opening 209 in the seat base 201 is desired, a layer of fabric 207 is required to be layered around that opening and preferably on the internal surface.

Preferably the intermediate layer 206 is not continuous between each surface, that is, the intermediate layer does not wrap around the vertically orientated corner regions 208 of the seat base. The corner regions 208 have a gap or thin section that provides a point of weakness in each corner of the structure to thereby provide a local buckling mode when under pressure from a substantially vertical direction. FIG. 10 shows the arrangement of fabric base layers where an upper layer 212 and lower layer 213 are arranged either side of an intermediate layer 214.

Preferably each of the outer edges of the base layers and lower edges of the side layers has a section of fabric that provides a region of overlap for additional support. Preferably the overlapping regions of the side fabrics extend approximately 50 mm across the base surface and the base fabrics extend approximately 30 mm up the side surfaces.

It should be appreciated that regions are shown to be overlapping, that region may instead be a continuous portion of fabric that extends between base and side walls. Similarly, where regions of fabric are shown to be continuous, those regions may instead be overlapping sections of fabric. Preferably any regions of overlap are approximately 30 to 50 mm in size.

Preferably the inner and outer periphery layers 204, 205 and upper and lower base layers 212, 213 are constructed with a resin infused bidirectional fabric such as carbon and/or KEVLAR (CKC) 0/90, bidirectional or coaxial type fabrics. The inner and outer periphery layers 204, 205 provide mechanical strength to the assembly. Preferably the CKC fabric is a Carbon and KEVLAR fabric of approximately 180 g/m$^2$. Preferably the intermediate layer 206 is a resin infused continuous filament mat (CFM) fabric. The intermediate layers 206 help to provide additional rigidity to the inner and outer periphery layers. Preferably the CFM fabric is approximately 450 g/m$^2$.

A layer 210 is provided on the inner periphery of the upper edge of the seat base 201 for additional support in the region where the seat pan 202 is to be joined to the seat base. Preferably the layer 210 also extends upward at the rear section of the seat base for providing additional support to the back section of the seat pan 202. Preferably the additional layers 210 extend approximately 30 mm beyond the flange where the seat base 201 meets the seat pan 202.

Preferably the upper support layer 210 and hatch support layer 207 are CFM fabric and approximately 450 g/m².

Members 215 may be provided to facilitate a secure mount through which fasteners can be located to attach the seat base to the floor of an aircraft cabin. Members 215 are preferably constructed with 75 mm wide carbon double bias fabric of approximately 400 g/mm².

Figure 12:
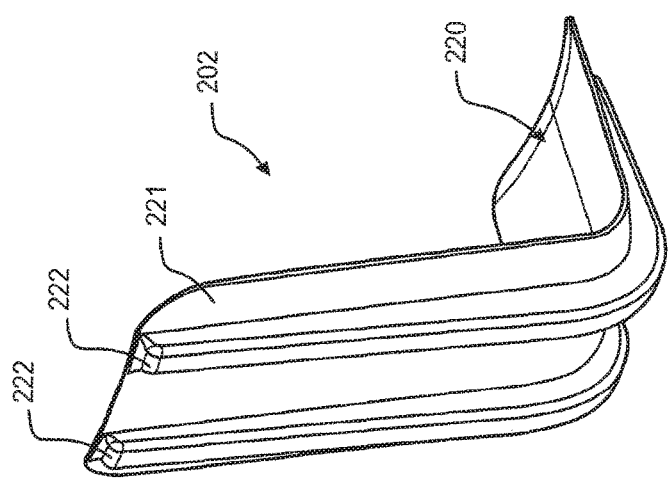
FIG. 12 shows a rear perspective view of the seat generally having a seat pan, seat back and a pair of support ribs.
Figure 14A:
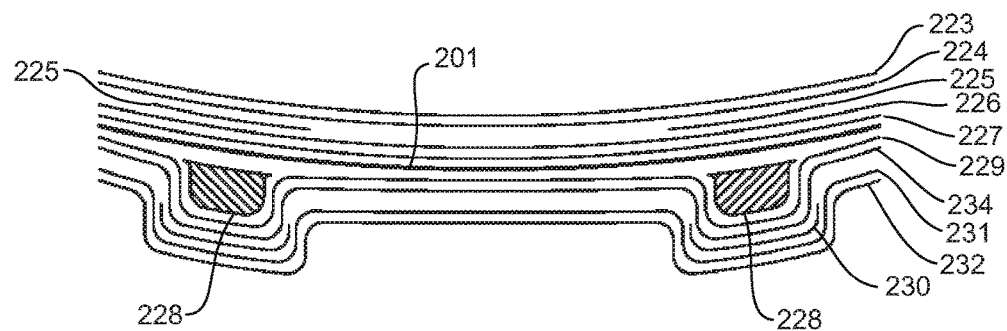
FIG. 14a shows in detail cross-section A-A.
Figure 14B:
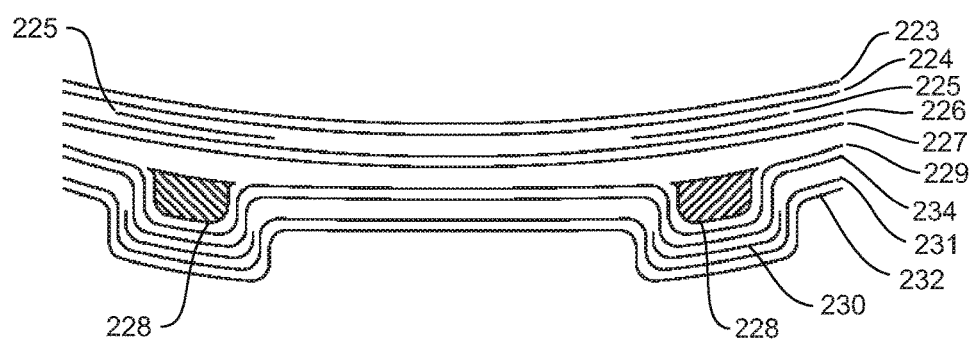
FIG. 14b shows in detail cross-section B-B.

The preferred arrangement of fabric layers for the upper composite section or seat 202 will now be described with reference to FIGS. 12 to 15. FIG. 12 shows a rear perspective view of the seat 202 generally having a seat pan 220, seat back 221 and a pair of support ribs 222. The support ribs extend from the top of the seat back 221 to the front portion of the pan 220. The support ribs help to maintain the rigidity of the seat structure in a survivable crash such that the seat back is substantially restrained from folding toward the seat pan. Preferably the seat 202 is constructed from a plurality of fabric layers which are infused and bonded together with resin to form a composite or matrix. Preferably the seat is bonded to the seat base using a methyl methacrylate structural adhesive such as ITW PLEXUS MA530 or MA550. However, adhesives such as CLICK BOND PERMABOND PARSONS ITW RAMSET A7 or other methyl methacrylates based epoxy adhesives are suitable alternatives.

Figure 13:
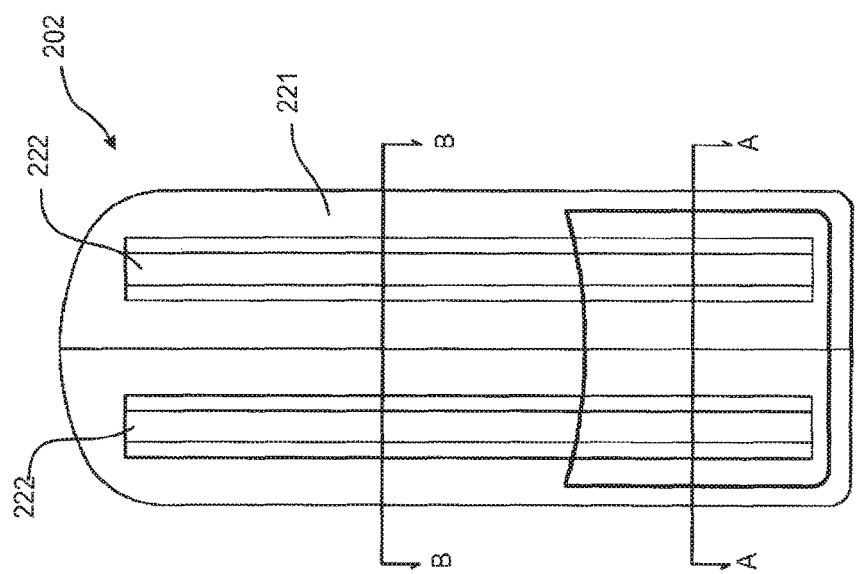
FIG. 13 shows a rear view of the seat having cross sectional lines A-A and B-B.

FIG. 13 shows a rear view of the seat having cross sectional lines A-A and B-B. Cross-section A-A is shown in detail in FIG. 14*a*. Cross-section B-B is shown in detail in FIG. 14*b*. Generally, the seat is constructed from alternating layers of structural fabrics such as CKC and fabrics such as CFM. A core material such as foam is used to space the layers of fabric apart to enable a composite I-beam type structure in the central portion of the seat 202 structure, however, the foam maybe omitted when using a spilt two mould method of infusion. Preferably each of the layers is arranged to continuously extend from the upper portion of the seat back 221 to the forward portion of the seat pan 220. However, it should be noted that the seat back and seat pan may be constructed using non-continuous sections of fabric and those non-continuous section joined with overlapping sections as described in relation to the seat base above.

A layer of CFM is used as a flow medium. The CFM layer does not contribute significant strength in itself but is used as to separate two structural materials to create a sandwich construction. Resin flows through and around carbon are problematic. The use of CFM as a flow medium addresses and alleviates problems with the gap and flow.

As mentioned, CKC is a material including carbon and KEVLAR materials. The carbon material is used to provide strength and stiffness. The KEVLAR material is used for its energy absorbing characteristics or as a labyrinth around the carbon. When the carbon structure fails mechanically the KEVLAR holds the structure together and contains the crush. The KEVLAR also prevents carbon fragments from becoming spears or cutting edges which could seriously injure an occupant.

The seat back and pan has a first surface layer 223 and second surface layer 224. Preferably the first surface layer 223 is of a material that provides mechanical strength such as CKC and approximately 180 g/mm². Preferably the second layer 224 is of a material such as CFM and approximately 300 g/mm².

A third layer 225 is pair of laterally spaced portions of fabric, each approximately 100 mm in width. The third layer may consist of more than one layer, and preferably two layers. Preferably the third layer is of a material such as Carbon uni (CU) and approximately 300 g/mm².

Fourth and fifth layers 226 and 227 are provided behind the thirds layer or layers. Preferably the fourth surface layer 226 is of a material that provides mechanical strength such as CKC and approximately 180 g/mm². Preferably the fifth layer 227 is of a material such as CFM and approximately 300 g/mm².

Two laterally spaced core members 228 are provided behind the fifth layer as an optional. The core layers provide a gap between the top and bottom layers to improve the mechanical strength of the assembly. Preferably the core members 228 are a PVC foam material or similar. The core member 228 may be omitted in a two piece split infusion mould system.

A sixth and seventh layers 229, 234 are provided behind the core members 228. Preferably the sixth layer 229 is of a material such as CFM and approximately 300 g/mm². Preferably the seventh surface layer 234 is of a material that provides mechanical strength such as CKC and approximately 180 g/mm².

A plurality of eighth layers 230 are laterally spaced and aligned with the core members 228. The eighth layers 230 are provided to give additional strength to the seat back and pan. Preferably the eighth layers 230 comprise three laterally spaced pairs of fabric. Preferably the eighth layer fabric is Carbon Uni and approximately 300 g/mm². Preferably the width of each section of fabric is approximately 50 mm.

Ninth and tenth layers 231, 232 close the rear side of the seat back and pan. Preferably the ninth layer 231 is CFM of approximately 300 g/mm². Preferably the tenth layer is CKC and approximately 180 g/mm².

The seat may be infused as a single action including all front, core and back laminate materials or the seat may be infused as a two process two piece split mould system where the forward half of the seat is infused as one part, the core material omitted and the aft half of the seat is infused as a second part. The two parts are then chemically bonded together using a methyl metacrylic structural adhesive.

The seat may be upholstered for comfort. Preferably the seat is upholstered using energy absorbing CF45 and CF47 foams as a cushion on the seat base to provide comfort and energy absorption properties.

The assembled seat and seat base provides a collapsible or crushable structure to absorb energy when an aircraft impacts the ground. The crushing process occurs in a preferred sequence; firstly the rear panel of the seat base will buckle; secondly the side panels will buckle; thirdly the front panel will buckle. Each of the corner regions 208 allows each of the seat base side panels to buckle substantially without causing buckling of the other panels.

If the loads on the seat and seat base during an aircraft impact are not substantial enough to buckle any or all of the seat base side walls, the impact loads will be distributed to other areas such as energy absorbing foam that may line the seat back and cushion.

Advantages offered by this embodiment include a construction that is light weight. The seat is less than half the weight of conventional stroking or a braking seat design while meeting the FAA FAR Part 27 crashworthy seat standard.

Preferably the energy absorbing seat assembly comprising an upper engineered composite laminate section and a lower engineered composite crushable section, wherein the use of the seat is anchored through the lower section to the cabin floor. Preferably the composite upper seat comprises a seat pan and seat back structurally bonded to a crushable composite seat base. Preferably the crushable seat base is compatible in both forward and aft positions. Preferably the structurally engineered seat comprises a seat pan and seat back which is an engineered laminate to produce calculated mechanical properties. Preferably the occupant is restrained into the seat in use by a seat belt assembly comprising lap and shoulder belts which are attached to the seat. Preferably the base section comprises structurally engineered seat base which is an engineered laminate to produce calculated mechanical properties and a designed order of collapse under certain load conditions. Preferably the purpose of the carbon laminate is to provide stiffness. Preferably the purpose of the KEVLAR is to contain the carbon laminate during crushing. Preferably the engineered laminate comprises at least one carbon fibre laminate and at least one arimid fibre laminate Preferably the crashworthy seat is designed to meet the certification requirements of Federal Aviation Authority (FAA). Federal Aviation Regulations (FAR), Title 14. Aeronautics and Space. Part 27. Airworthiness Standards; Normal Category Rotorcraft. Preferably the seat comprising seat pan and seat back laminates are infused using the RTM process. Preferably the seat base laminates are infused using the RTM. Preferably the seat is bonded to the seat base using structural adhesive HPR25A/B. Preferably energy absorbing foam CONFOR CF45 and CONFOR CF47 is installed in the seat base to further assist energy absorption. Preferably the seat is upholstered using energy absorbing CF45 and CF47 foams in the seat base cushion. Failure is predicted in the following modes and sequence—back panel buckle, side panel buckle, and global buckle. Preferably the local buckling modes (panels) do not result in ultimate failure if remaining structure can support buckled shape and redistribute load to other areas.

Prior art helicopter structures or framework comprises materials such as wood, aluminium, titanium, chrome molybdenum steel tubing and magnesium alloys. Fabrication and manufacturing of helicopter structures are based around the extensive use of special jigs and frames and certified holding fixtures where floors and jigs, frames and fixtures are frequently calibrated. Such installations have inherent disadvantages including that they are fixed in a location and are not mobile.

The prior art fuselage fabrication and manufacturing process requires the fuselage to be constructed by first assembling internal components and working outward. The prior art method of constructing a helicopter begins by identifying a starting location or part such as a central floor panel. The internal structure of the fuselage is then added systematically around that starting location by adding sub frames and panels. The assembly is then strengthened by riveting or bolting adjoining sub frames and panels to form a skeleton. Once all of the internal structure has been completed the fuselage skeleton is enclosed with a skin that is either riveted or bolted into place, usually by direct attachment to the skeleton. When the primary structure of the fuselage is completed and the fuselage is structurally sound it would be removed from the fabrication or manufacturing assembly jig.

Traditional helicopter fuselage manufacturing has numerous disadvantages. Of substantial note is that construction is extremely labour intensive. The completed fuselage has a vast number of individual parts, each requiring prior fabrication. To track and assemble these parts requires a skilled work force. Further, the fabrication jigs have long set-up times and long breakdown times. Production of helicopter fuselage in traditional manner is very expensive.

A further disadvantage to traditional helicopter manufacturing is the finished external surface of the helicopter fuselage covered in a mass of domed rivet heads. This type of finish is both unattractive and results in high drag penalties. Significant materials cost and time is associated with the use of flush head rivets in the outside skin of the fuselage to remove the drag penalty.

A further disadvantage to traditional helicopter fuselage fabrication using sheet metal panels to form the outer skin of the fuselage is the difficulty in achieving a smooth and thus aerodynamically favourable shape.

A further disadvantage to traditional helicopter fuselage fabrication is that door and window openings are typically hand finished. Finishing by hand results in no two door or window openings being the same. Each window or door therefore requires individual shaping, usually by hand, to ensure a fitment that allows closure without gaps.

A further disadvantage to traditional helicopter fuselage manufacturing using riveted structures and thus lapped joints is the ingress of moisture. This moisture becomes trapped and corrosion will ensue. Corrosion can lead to structural failure.

According to one embodiment the invention is a fuselage structure for an aircraft, and preferably a helicopter. FIGS. 15 to 32 show the preferred helicopter fuselage, preferred components of that fuselage and preferred process of assembly. The preferred fuselage forms the outer shell of the helicopter and the outer shell is a load bearing structure. In this specification a load bearing fuselage means the outer shell of the helicopter provides primary structural support for the helicopter, including, but not limited to, supporting the engine and gearbox mechanisms, a cabin, fuel cells, a tail boom and tail rotor assembly and an empennage. The preferred fuselage is constructed from a composite, that is, a lamination of a plurality of fabric layers that are, or are to be infused with a polymer, including Polyester, Vinyl ester and Epoxy resins, that is cured or can be cured to lock the layers together in a substantially rigid formation. Preferably the resins are UV stable.

The composite fuselage structure may offer advantages such as reducing manufacturing effort compared to traditional metal frame based aircraft. The composite fuselage is preferably formed, at least in part, in a mould. A moulded airframe offers advantages such as repeatability of part size and shape. Repeatability of parts goes at least some way toward ensuring accurate fitment of adjoining parts or assemblies, thereby somewhat ameliorating the requirement for individual attention to the fitment of adjoining parts which is often prevalent in traditional metal frame based aircraft.

A further advantage that may be provided by the composite fuselage structure is durability. A traditional metal frame based aircraft has a working life that is somewhat dictated by the stresses imparted during flight and by engine and working surface induced vibration. Metal is known to eventually crack in such environments, therefore dictating strict flight hour records to ensure the aircraft materials are not used beyond a safe duration. The preferred composite fuselage has an improved rate of deterioration compared with a metal fuselage.

A further advantage that may be provided by the composite fuselage structure is replacement of some or all of the fuselage should mechanical damage occur, for example, by bird strike or inadvertent strike from a ground based object. A damaged section of composite fuselage can be cut and a replacement composite section installed. The preferred replacement of a section of fuselage includes cutting a damaged section from the airframe, preparing a section of the airframe that substantially corresponds to the removed section and installing the section of airframe, preferably with a region of fabric in the composite lamination structure to that overlaps with the existing structure.

A further advantage that may be provided by the composite fuselage structure is the pre-positioning of key identifiers within the mould such as alignment stations, dimension marks and one or more locating datums.

A further advantage that may be provided by the composite fuselage structure is the pre-positioning of window rebates, cabin and cargo door rebates and inspection panel rebates.

A further advantage that may be provided by the composite fuselage structure is the moulding inclusion of opening sealing flanges for windows, cabin and cargo doors and inspection panels and hatches.

Replacing a section of the fuselage also includes replacing large fuselage regions such as the tail boom. To replace a tail boom, the existing tail boom is cut from the fuselage in the region proximate the central fuselage section, or at least proximate a damaged section of the tail boom. A replacement tail boom that substantially corresponds to the removed tail boom can be prepared and abutted to the remaining fuselage structure. The grafting process includes preparing section of composite material and overlapping that composite material across the abutting region.

Figure 15A:
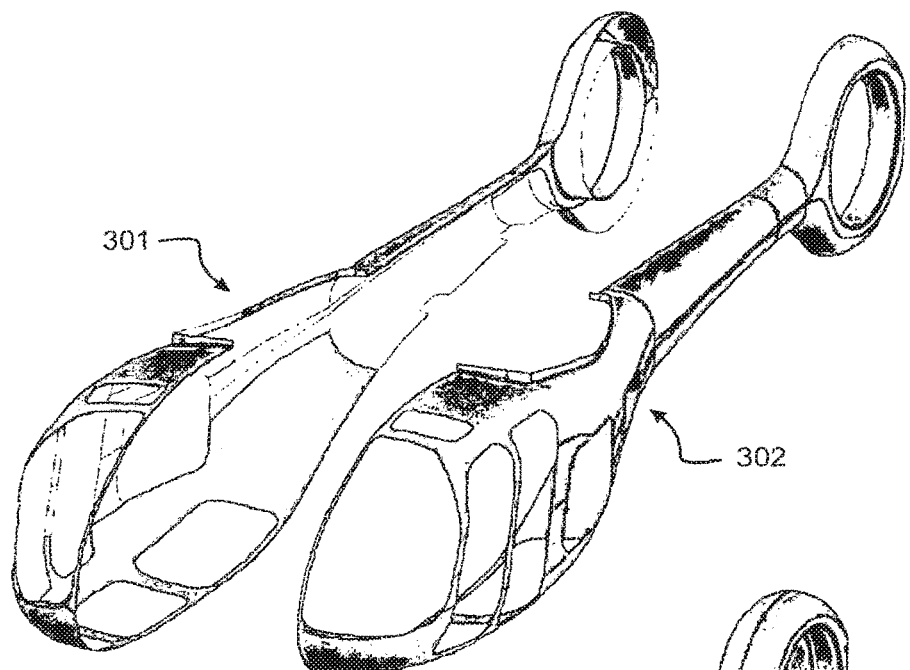
FIG. 15a shows two sections of an outer shell of a helicopter.
Figure 15B:
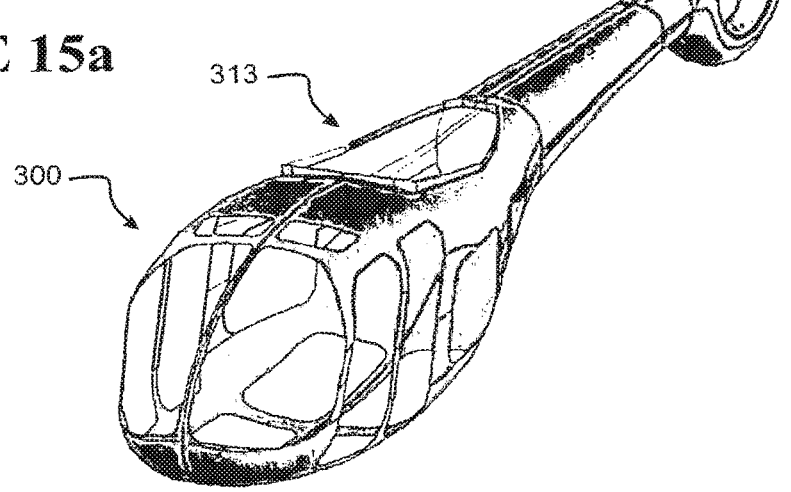
FIG. 15b shows each section of the shell is preferably formed separately by a moulding process then joined together to form a unitary fuselage structure.

FIG. 15(a) shows two sections of an outer shell of a helicopter 301, 302. Each section of the shell is preferably formed separately by a moulding process then joined together to form a unitary fuselage structure 300 as shown in FIG. 15(b).

Preferably the fuselage sections 301, 302 are made of a composite material and by a moulding process. Preferably the composite material has several layers of fabric including an outer layer of CFM of approximately 300 g/mm$^2$, a next layer CKC of approximately 190 g/mm2, a layer of any additional supporting material, a foam or filler layer such as SORIC of approximately 2 mm, a next layer CKC of approximately 190 g/mm2 and a next layer of CFM of approximately 300 g/mm2.

The outer layer of CSM forms layer is to protect against impact and abrasion damage. Optionally a layer of gel coat is applied to the mould surface before the laminate structure is laid up to promote a smooth outer fuselage surface and ease of release from the mould.

Preferably each of the fabric layers is laid into a mould that substantially conforms to the shape of the outer surface of the desired fuselage sections 301, 302. The layers of fabric are then infused with a UV stable resin composition and optionally subjected to a vacuum process to lock the structure together. Several methods of resin infusion can be used including a single vacuum bag method, dual vacuum bag method, silicon bag method or Light RTM contra mould method. The cured layers remain in their respective moulds. The moulds are then rotated and joined together either by bolting or clamping. The infused sections 301, 302 are then laminated together. The laminating joining process is performed either by infusion or hand lay. Once the whole of the fuselage has cured the mould halves are withdrawn from the completed fuselage structure.

The preferred layup process for each fuselage half is as follows, and the opposing mould half would be similar. The fuselage mould is preferably prepared by cleaning, polishing and the application of a release agent. The mould is optionally sprayed with a sacrificial gel coat approximately 0.018" to 0.022" thick and the gel coat allowed to cure. The fuselage outer layer or shell laminate preferably comprises CFM 300, CKC 190, plus additional laminates, which are location specific additional laminates throughout the length of the fuselage plus SORIC 2 mm, CKC 190 plus CFM 300. Additional laminates may be desired to strengthen or stiffen specific areas of the structure dependant on loads and load paths.

Once all laminates are correctly laid and additional laminates correctly positioned the fuselage mould is sealed with an optional single vacuum bag, a dual vacuum bag, a silicon vacuum bag or a Light RTM conta mold. Preferably vacuum is applied at 100%. Preferably vacuum leak tests are carried out. Preferably the entire fuselage is left under vacuum for a minimum of 12 hrs. The fuselage mould is preferably heated during this time to +30° C. The inside of the fuselage mould is also heated to +30° C. The preferred resin is a vinyl ester and epoxy blend resin DERAKANE 510C-350FR is activated with 0.2% cobalt and retarded 0.7%. Preferably the resin is heated to +30 deg C.

Immediately prior to infusion beginning a final leak test is carried out on the fuselage laminate under vacuum. Leak test is to be <2-3 mb/minute. Preferably the infusion resin as prepared is catalysed at 2% immediately prior to infusion in sufficient quantities to maintain infusion of the fuselage in a single smooth process.

Infusion is preferably performed in a specific order to ensure complete infusion and to avoid lockout by beginning at the deepest part of the mould and progressing to the lowest vacuum port, then progressively further resin valves are opened to influence the resin flow. The trimmed and joined fuselage outer shell or fuselage can be constructed, in a size suitable for a six person helicopter, to less than 100 kg.

Figure 16:
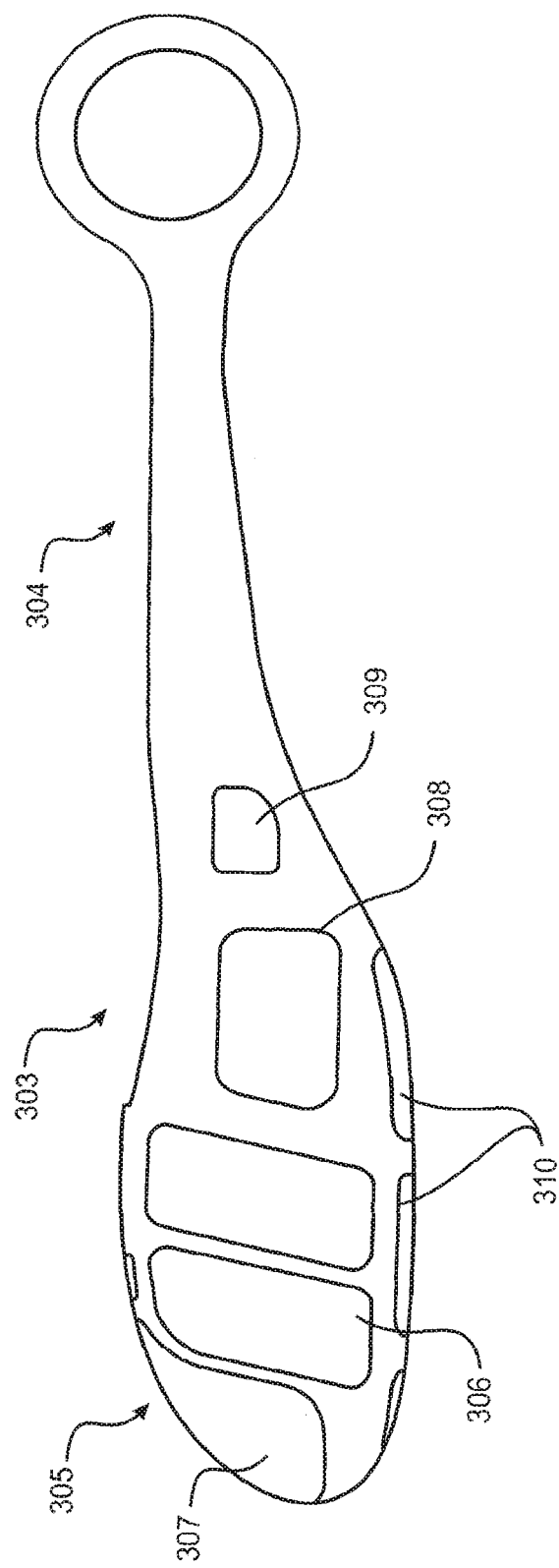
FIG. 16 shows a side view of the helicopter shell.

FIG. 16 shows a side view of the helicopter shell. Preferably the shell 300 has a central fuselage region 303 and tail region 304 that are integrally formed. Preferably the central fuselage region 303 is adapted a support at least an engine and drive train, and may further support fuel tanks and structural members such as beams and bulkheads. The drive train includes the main rotor gear box that is adapted to drive the main rotor and connect to a shaft that drives the tail rotor.

The fuselage outer shell is a hollow frameless structure when removed from the fuselage moulds. To complete a helicopter assembly various members including keel beams, floor panels and bulkheads are to be installed in a preferred order such that the flight loads imparted to the fuselage and those loads from the main and tail rotor systems and engine are distributed about the helicopter airframe. Each member has a size and location within the fuselage to adequately distribute that load. Each member is inserted in order into the hollow fuselage through an opening delineated by the outer shell such as an opening for a cabin door. Each member is trimmed to size and once inside the fuselage is permanently bonded in place.

The fuselage is preferably assembled in the following order: Tail boom forward bulkhead 311, Fuel tank aft bulkhead 312, Keel beams 313, Keel beams 314, Transverse beams 315, fuel bay floor 317, aft cabin bulkhead 318, cabin floor 319, upper bulkhead 321, central cargo floor 323, side cargo hold floors 324, side cargo hold roof panels 325, aft hold floor 326, engine drip tray 327, windscreens and windscreen mullion 328 and roof window panels 329.

Preferably the tail region 304 includes at least a tail boom. However, the tail region may also include items such as a tail rotor mount and/or an empennage and/or flight stabilisation appendages.

The shell 300 may also include an integrally formed forward section 305 having a cabin for housing a pilot, passengers and flight controls. Preferably the shell 300 includes an integrally formed forward section 305 and delineates a plurality of openings for windows 307, doors 306, inspection hatches 309, 310, storage areas 308 and the like. Preferably the openings allow all other components of the helicopter to be installed. For example, items such as bulkheads, beams, walls and supporting structure, together with ancillary components such as flight control mechanisms, fuel cells, engines and drive train are to be installed after the fuselage sections 301, 302 are joined.

FIGS. 17 to 28 show a number of components preferably installed internal to the fuselage 300. The components are installed in a preferred order.

Figure 17:
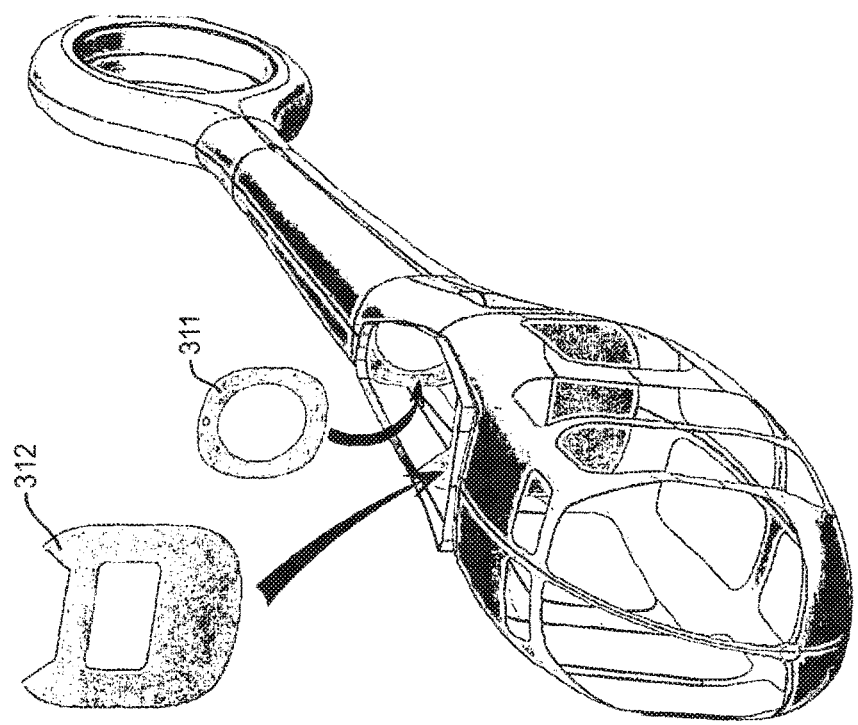
FIG. 17 shows a member or bulkheads preferably installed in the rear of the central fuselage or forward portion of the tail boom to provide internal support.

FIG. 17 shows a member or bulkheads 311, 312 preferably installed in the rear of the central fuselage or forward portion of the tail boom 304 to provide internal support. Preferably the bulkheads 311, 312 are installed through the opening 313 defined at the top of the fuselage. Bulkheads 311, 312 are preferably installed to provide support or mounting locations for an engine and rotor gearbox.

Figure 18:
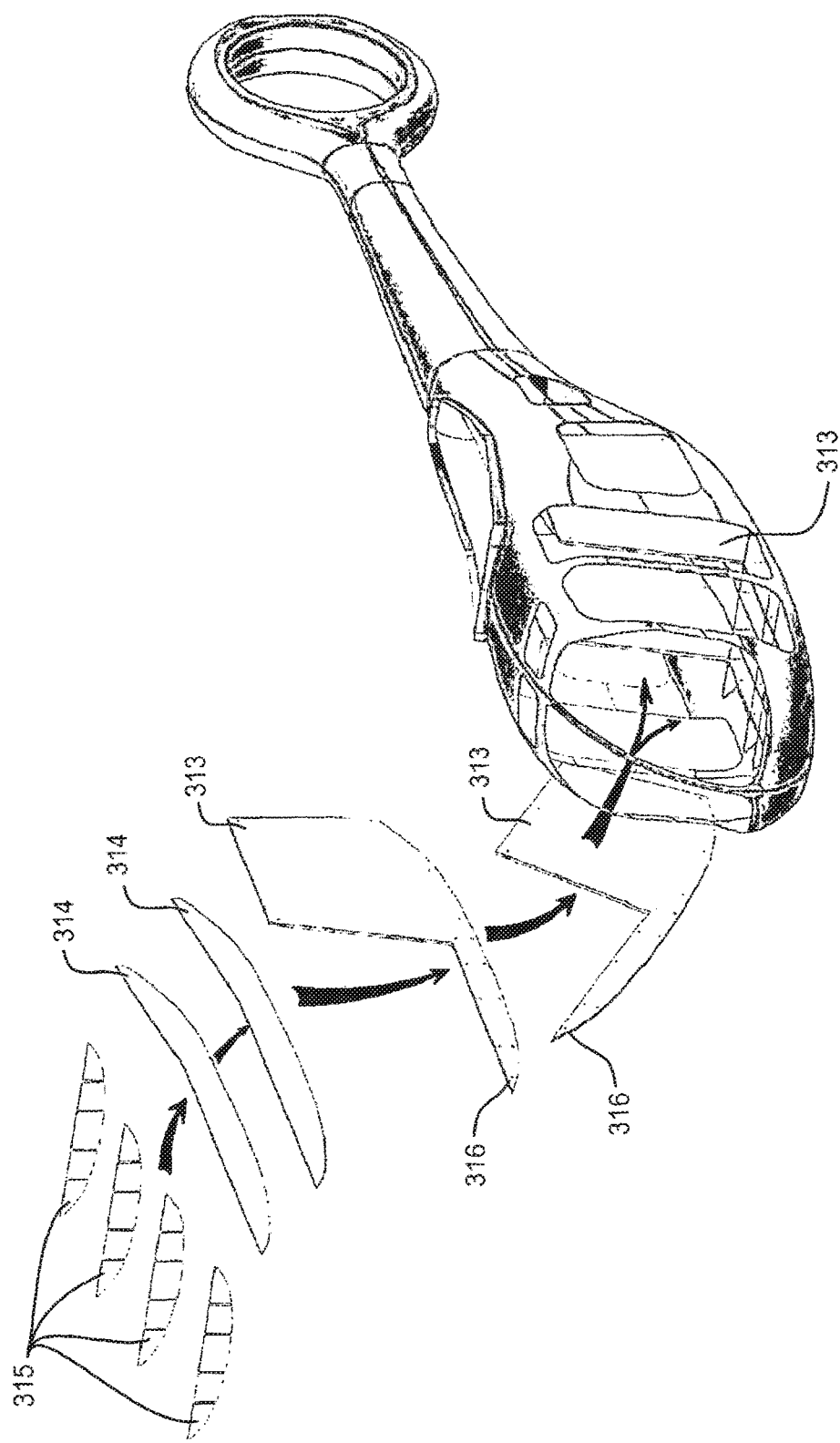
FIG. 18 shows a pair of members or keel beams having a forward protruding member.

FIG. 18 shows a pair of members or keel beams 313 having a forward protruding member 316. Preferably the keel beams are adapted to extend from the upper internal surface of the central section of the fuselage to the lower internal surface. Preferably the members 316 are adapted to extend forward to the cabin area 305 to provide support for a cabin floor. Preferably members 314 are adapted to compliment members 316 and provide further support for a cabin floor. Preferably members 314 are adapted extend front the front region of the cabin to the rear region of the central fuselage section. Preferably members 315 are adapted to extend transversely to members 316 and provide further support for a cabin floor and seats installation. Preferably each of the members 314, 315, 316 are adapted to mesh or join with at least some overlap to form a lattice like structure that extends through the lower region of the cabin space 304. Preferably the members 314, 315, 316 are shaped such that they substantially conform to the contour of the lower inner surface of the fuselage 300 such that the structure can be bonded together to form a substantially rigid structure. Preferably each of the members 314 to 316 are adapted to be inserted into the internal region of the fuselage through an opening such as the front window opening 307 or a door opening 306. The upper region of the beams 313 are preferably adapted to connect to a engine and/or gearbox structure and distribute loads associated with the engine and gearbox to the fuselage walls.

Figure 19:
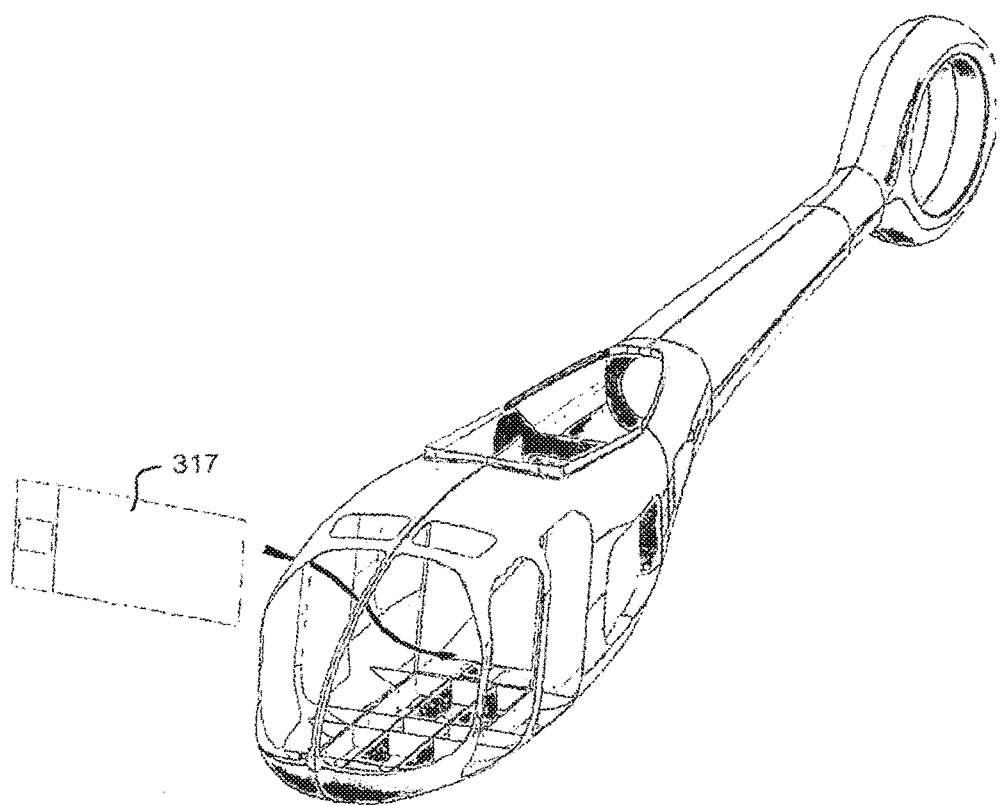
FIG. 19 shows a member or panel adapted to be inserted through the front window opening and be located between the keel beams to thereby create a floor where ancillary items such as a fuel cell may be placed or mounted.

FIG. 19 shows a member or panel 317 adapted to be inserted through the front window opening 307 and be located between the keel beams 313 to thereby create a floor where ancillary items such as a fuel cell may be placed or mounted.

Figure 20:
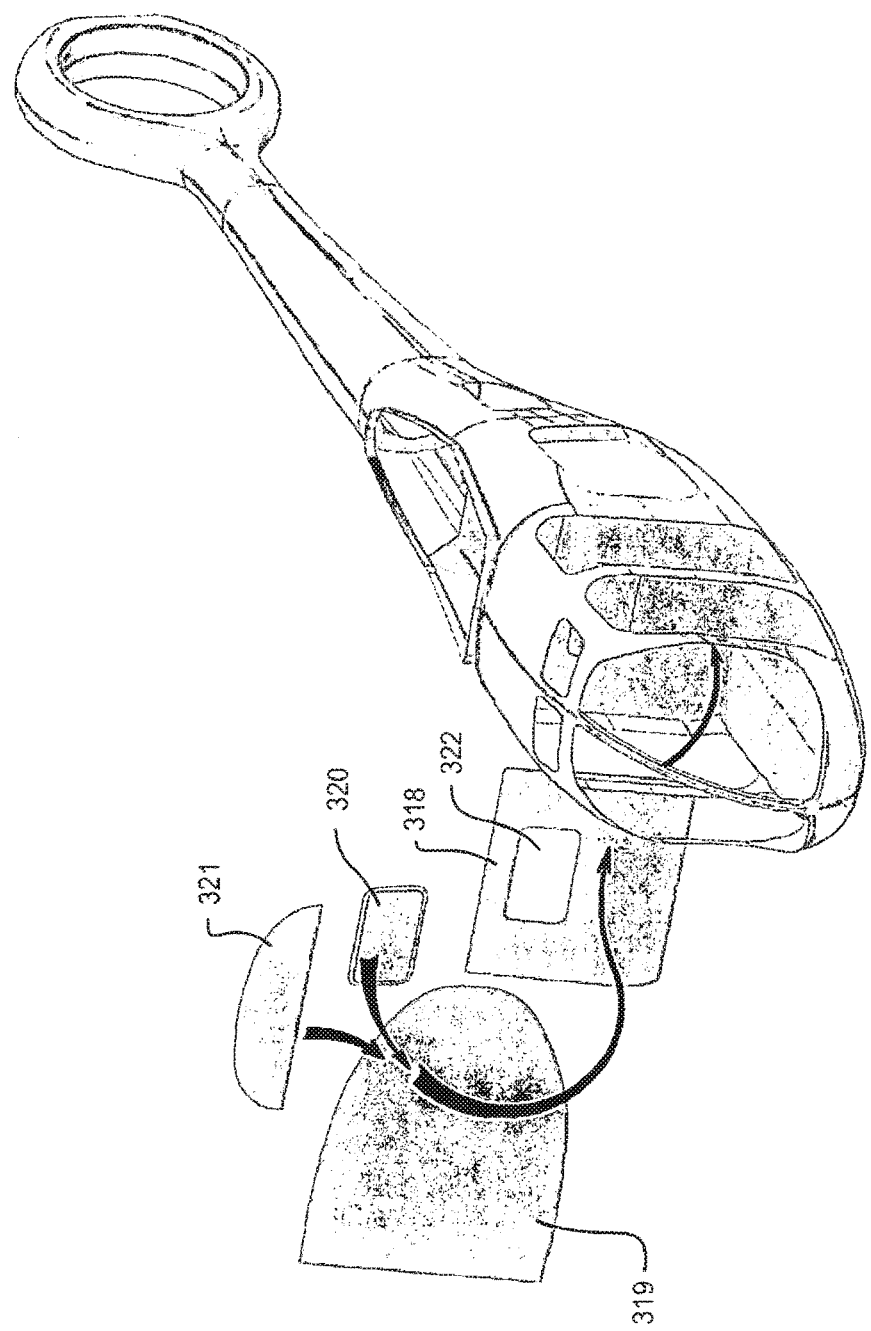
FIG. 20 shows a cabin floor panel which can be inserted through a window opening and positioned above and joined to floor members.

FIG. 20 shows a cabin floor panel 319 which can be inserted through a window opening 307 and positioned above and joined to floor members 314, 315, 316. Bulkhead panel 318 extends from a region closer to top inner surface of the fuselage 300 to the bottom inner surface, and preferably also spans between the internal surfaces of the fuselage side walls. Panel 318 optionally includes an inspection hatch 322 that and complimentary hatch cover 320. A further panel 321 is adapted to attach between the upper edge of the panel 318 and the top inner surface of the fuselage. Preferably panel 321 is removable to facilitate inspection of the fuselage area immediately aft, which may house an engine or drive mechanism. Preferably the beams 313, floor members and bulkhead panel 318 form an enclosure for isolating one or more fuel cells housed within the enclosure from impact energy.

FIG. 21 shows a floor panel 323 that can be inserted through the inspection hatch delineated by the top surface of the fuselage 300 and optionally joined to the keel beams 313.

Figure 23:
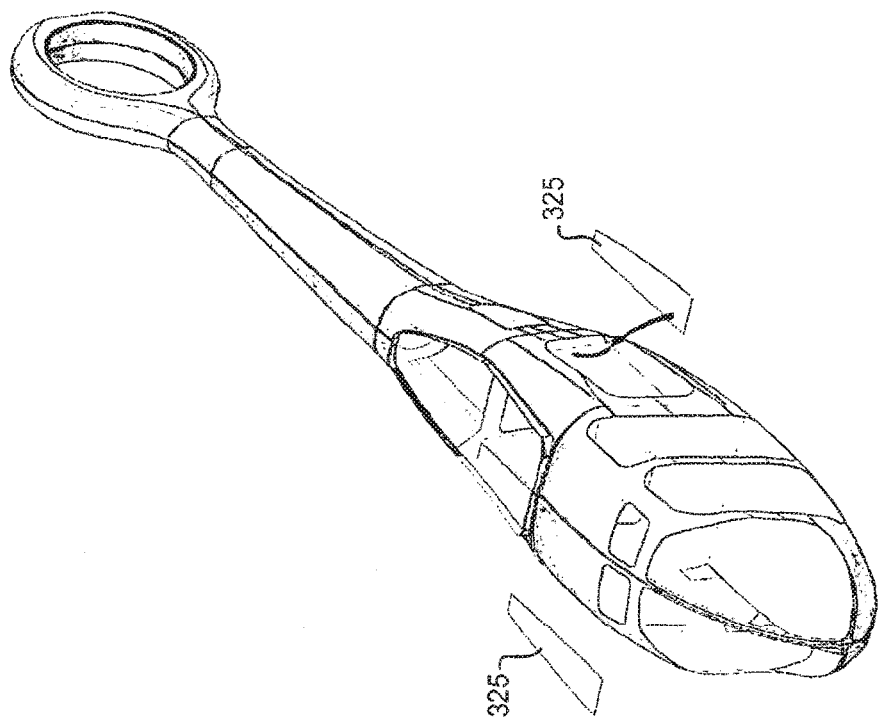
FIG. 23 shows panel adapted to be upstanding on the rear region of the central fuselage to form a ceiling to the space located below.

FIG. 22 shows optional panel 324 adapted to be located on the lower outer floor regions of the central fuselage to facilitate a flat surface for cargo storage. FIG. 23 shows panel 325 adapted to be upstanding on the rear region of the central fuselage to form a ceiling to the space located below.

Figure 24:
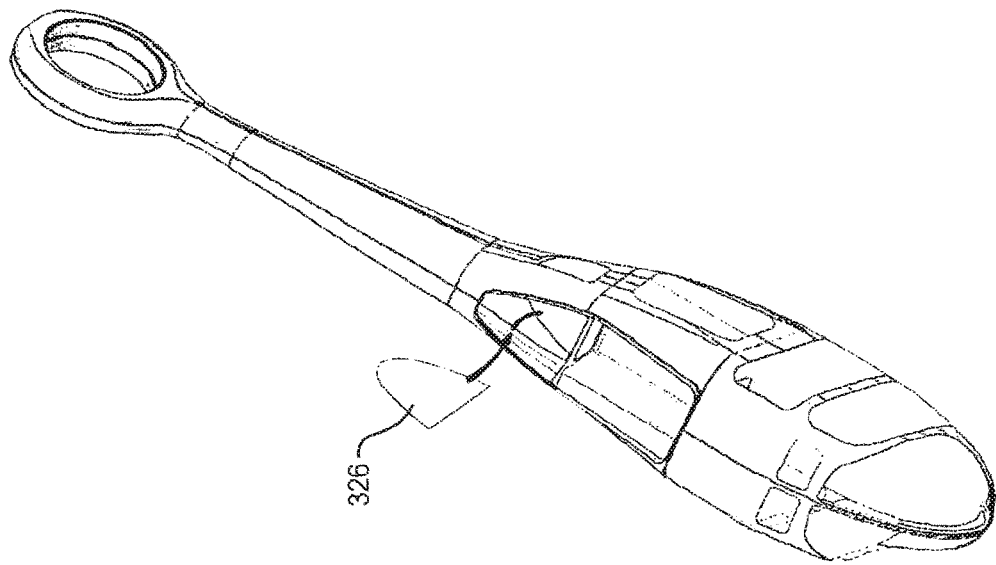
FIG. 24 shows a floor panel adapted to be inserted through the opening in the top region of the central fuselage section.

FIG. 24 shows a floor panel 326 adapted to be inserted through the opening in the top region of the central fuselage section. Preferably the floor panel is adapted to join to the joined to the inner surface of the fuselage and surrounding structure.

Figure 25:
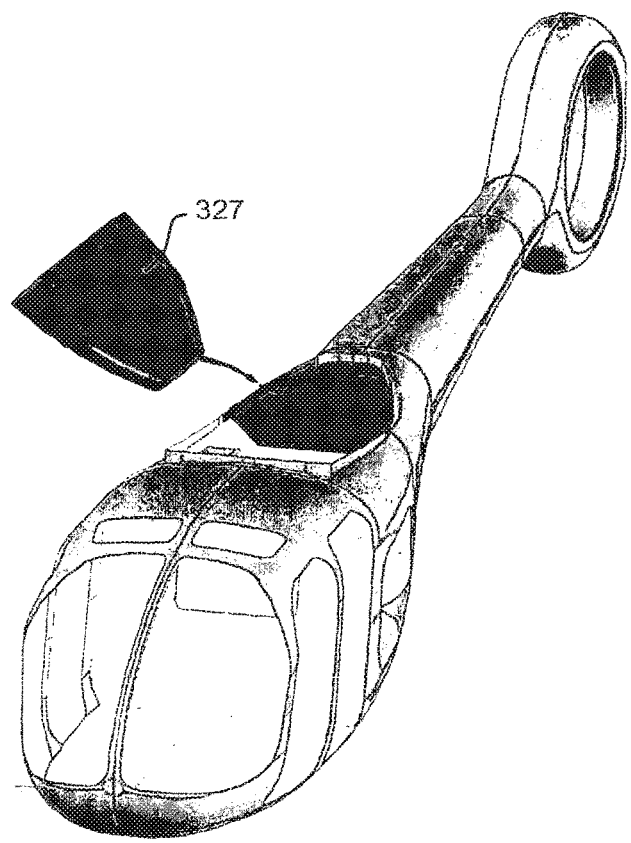
FIG. 25 shows a panel adapted to be inserted through the opening in the top region of the central fuselage section and close the internal region of the central fuselage from the tail boom region.

FIG. 25 shows a panel 327 adapted to be inserted through the opening in the top region of the central fuselage section and close the internal region of the central fuselage from the tail boom region.

Preferably the internal structure including panels, walls, member and beams 311-327 are made of a composite material and by a moulding process. Preferably the composite material has several layers of fabric including an outer layer of CFM of approximately 300 g/mm2, a next layer CKC of approximately 190 g/mm2, a layer of any additional supporting material, a foam or filler layer such as SORIC of approximately 2 mm, a next layer CKC of approximately 190 g/mm2 and a next layer of CFM of approximately 300 g/mm2. The outer layer of CSM forms layer is to protect against impact and abrasion damage. Optionally a layer of gel coat is applied to the mould surface before the laminate structure is laid up to promote a smooth outer fuselage surface and ease of release from the mould.

The members are largely flat panel sections including primary structure, secondary structure and tertiary structure and are an engineered laminate specific for each parts purpose. Primary structure is direct load bearing structure design to carry flight engine and transmission loads through the airframe. An example of primary structure is the keel beam 313 and fuselage structure 301 and 302. Secondary structure carries indirect loads and shared loads from primary structure through the airframe. An example of secondary structure is the floor 323. Tertiary structure is minor load carrying structure the failure of which would not lead to subsequent failure of secondary or primary structure. An example of tertiary structure is the panel 327.

A typical layup process for each flat panel would be as follows. The laminating table is prepared by cleaning, polishing and the application of a release agent. The table is then optionally sprayed with a sacrificial gel coat approximately 0.018" to 0.022" thick. The gel coat is allowed to cure. Each flat panel differs in its laminate structure. The basic flat panel laminate may have additional laminates, which are location specific throughout the panel. Additional laminates may be desired to strengthen or stiffen specific areas of the structure dependant on loads and load paths.

Once all laminates are correctly laid and additional laminates correctly positioned the table mould is sealed with an optional single vacuum bag, a dual vacuum bag, a silicon vacuum bag or a Light RTM conta mold. Vacuum is then applied at 100%, vacuum leak tests are carried out and the entire table is left under vacuum for a minimum of 4 hrs. The table mould is heated during this time to +30° C. The vinylester/epoxy blend resin DERAKANE 510C-350FR is activated with 0.2% cobalt and retarded 0.7%. The resin is heated to +30° C. Immediately prior to infusion beginning a final leak test is carried out on the table laminate under vacuum. Leak test is to be <2-3 mb/minute. The infusion resin as prepared is catalysed at 2% immediately prior to infusion in sufficient quantities to maintain infusion of the fuselage in a single smooth process. Infusion must be done in a specific order to ensure complete infusion and to avoid lockout. Infusion begins at the deepest part of the laminate and is allowed to progress, then progressively further resin valves are opened to influence the resin flow.

Figure 26:
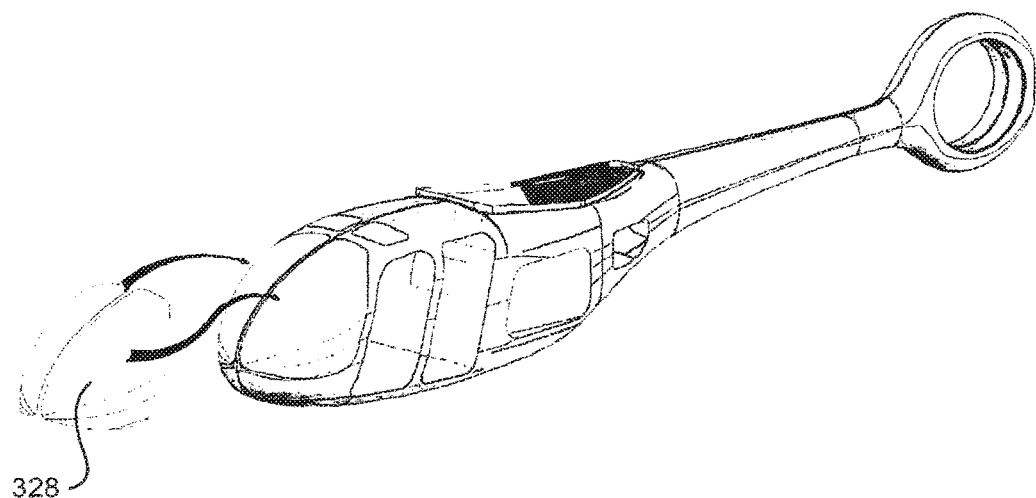
FIGS. 26 and 27 show front windows and cabin roof adapted to attach to openings delineated by the fuselage.
Figure 27:
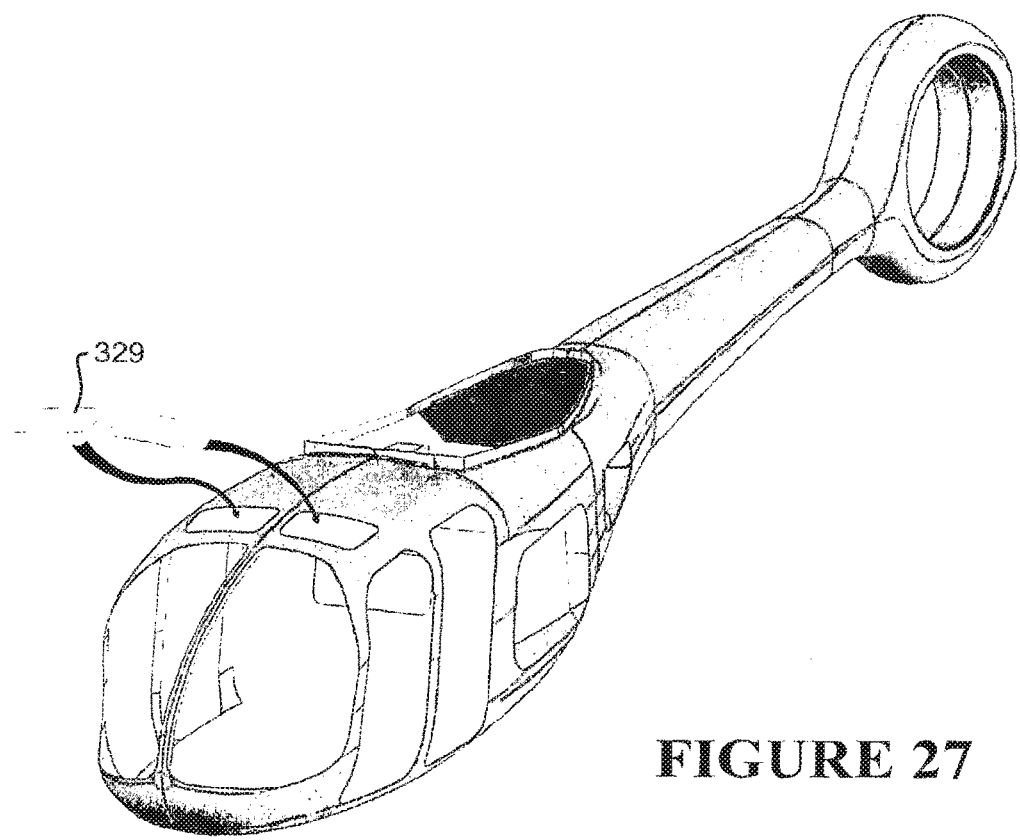

FIGS. 26 and 27 show front windows 328 and cabin roof 329 adapted to attach to openings delineated by the fuselage.

Figure 28:
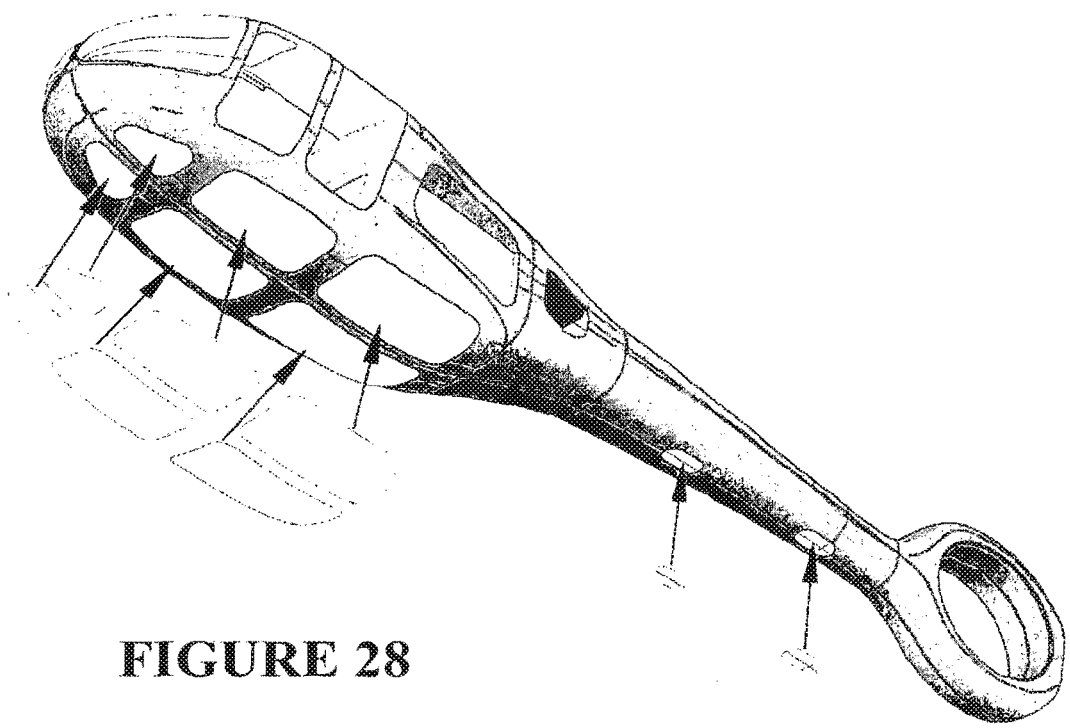
FIG. 28 shows a plurality of covers adapted to close window openings and inspection hatches delineated by the fuselage.

FIG. 28 shows a plurality of covers adapted to close window openings and inspection hatches delineated by the fuselage. Windows are vacuum formed to the moulded fuselage shape to match the moulded window rebates. Windows are installed using a vulcanizing process. Cabin, Cargo and hatch seals are a press fit to the preformed rebates created during the moulding process. Cabin, Cargo and hatch hinges and latches are match drilled to mould stations and identifiers preformed during the moulding process.

One disadvantage of the prior art is that recesses for windows and doors are typically finished by hand. Hand finishing results in a structure that has a unique profile thereby requiring windows, doors and the like that are to be fitted into the recess are to also be hand finished to ensure they will fit, and fit without excessive gaps.

In this preferred embodiment each of the components and appendages internal to the fuselage are formed by a composite moulding process. The process provides advantages such as accurate shape reproduction when many such items are to be produced. The accurate reproduction of item shapes provides the advantage of being able to replace items on the fuselage without requiring any specific attention to the fitment of that item. Accurate fitment allows manufacturing cost and time to be greatly reduced.

Figure 29:
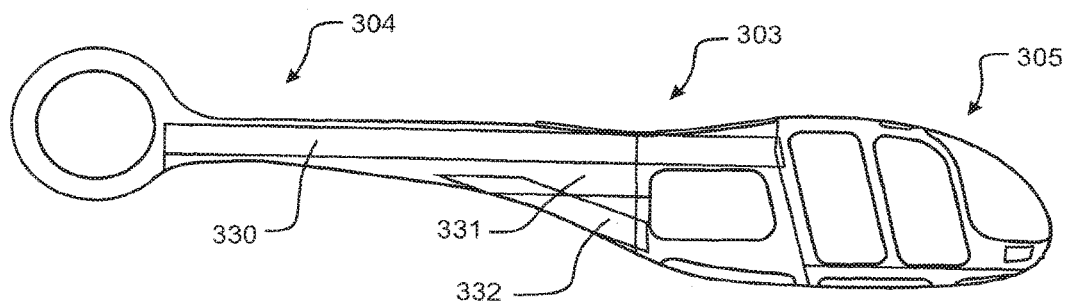
FIG. 29 is a side view of one preferred embodiment of the helicopter fuselage.
Figure 30:
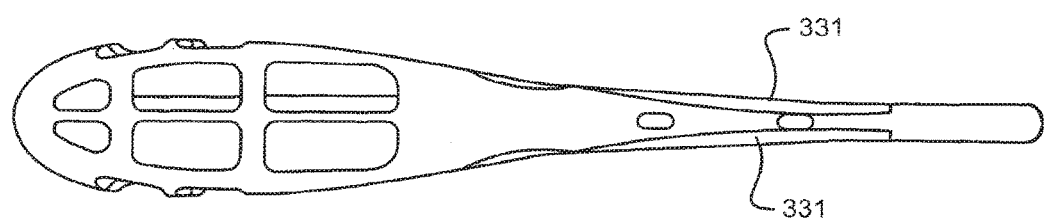
FIG. 30 is a bottom view of one preferred embodiment of the helicopter fuselage.

One preferred embodiment of the helicopter fuselage is shown in FIG. 29 as a side view and in FIG. 30 as a bottom view. Preferably the fuselage is a continuous laminate structure that includes at least the central fuselage section 303 and the tail boom 304. An optional cabin region 305 is included in the continuous fuselage section as shown in the drawings. Preferably the continuous central fuselage section 303 and the tail boom 304 include reinforcing members that span the region of continuity. Preferably a first member 330 is located on the surface of an upper region of the fuselage and spans the surface of the upper region of the central fuselage section to the surface of the upper section of the tail boom. Preferably a second member 331 is located on the surface of the fuselage below the first member and spans the upper region of the central fuselage surface section to the middle and lower surface sections of the tail boom. Preferably a third member 332 is located on the surface of the fuselage and spans between a lower region of the central fuselage section to at least some way into the surface of the tail boom region.

Preferably each of the first second and third members are made of a fabric such as unidirectional carbon fibre fabric of approximately 200 g/mm². Preferably each of the first second and third members are approximately 200 mm to 300 mm wide. Preferably these members are integrated into the laminate structure of the fuselage as an 'additional laminate'. Preferably the members are centrally located between inner and outer surface layers. Preferably each of the first second and third members span a transition zone define as the region between the central fuselage section of the fuselage and the tail boom.

The members provide additional strength and stability to the tail boom and any empennage structure located on the tail boom relative to the central fuselage section.

The method of constructing the helicopter includes the following steps in the following preferred order. Those skilled in the art will recognise the particular assembly process may be reordered.

1. Preparing a load bearing fuselage outer skin or shell, including preparing and joining two opposing sections of fuselage.

The joined fuselage includes a centre section, tail boom and optionally a forward section. The tail boom optionally including an empennage. The fuselage preferably delineating door and window openings. The optional forward section including a cabin for housing a pilot, passengers and flight controls. The centre section adapted a support an engine and drive train. The tail boom and empennage being substantially of a monocoque structure. The empennage adapted to support a ducted fan tail rotor assembly, horizontal and vertical stabilisers. The load bearing fuselage further delineating an opening located on an upper surface adapted to allow the engine-main rotor gearbox and drive train module to be inserted and internally attached.

Preferably the load bearing fuselage is prepared by layering several fabric layers and infusing those layers with a polymer or resin to form a composite structure. Preferably the opposing fuselage sections are joined while each still in their respective moulds.

2. Preparing at least two keel beam components.

Preferably the keel beam components are prepared by layering several fabric layers and infusing those layers with a polymer or resin to form a composite structure.

3. Installing the at least two keel beam components by inserting them through a window or door opening in the fuselage.

4. Connecting an upper region of the at least two keel beam components. The connection can be made by applying a section of fabric to overlap regions of the proximate regions of the fuselage and beams and infusing the fabric with a polymer or resin to form a composite structure.

5. Preparing at least two bulkhead components.

6. Installing the at least two bulkhead components by inserting them through a window or door opening in the fuselage.

7. Connecting an upper region of the at least two bulkhead components. The connection can be made by applying a section of fabric to overlap regions of the proximate regions of the bulkheads, fuselage and beams and infusing the fabric with a polymer or resin to form a composite structure. Preferably the at least two bulkhead components include a rear bulkhead and a forward bulkhead which define an enclosed space together with the at least two keel beam components for housing fuel cell components 8. Preparing at least one floor panel 9. Installing the floor panel into the fuselage by inserting them through a window or door opening in the fuselage.

Preferably the fuselage or at least a section of the fuselage, including a centre section and tail boom section, is constructed according to the following preferred order of steps. However, those skilled in the art will recognise the assembly steps need not take place in strict order.

1. A mould is prepared and the inside surface of that mould coated in a release agent such as gel coat or liquid wax. Gel coat approximately 0.018"-0.022" thick may optionally be applied.
2. A layer of CFM fabric is laid in the mould.
3. A layer of CKC fabric is laid in the mould.
4. An optional layer, or layers, of fabric is laid in the mould.
5. A layer of core medium such as SORIC is laid in the mould.
6. A layer of CKC fabric is laid in the mould.
7. A layer of CFM fabric is laid in the mould.
8. The layers of fabric are locked together, preferably by a resin infusion process.

Optional layers include additional structural stability enhancing fabrics embedded in the layers of other fabrics. Optional layers may be desired to strengthen regions of the fuselage proximate window and door openings, hatches and regions where other attachments or fastenings are located. Optional layers may be a layer of CDB (carbon double bias), alternatively an optional layer may be a layer of CU (carbon uni) to form a load bearing member.

Figure 31:
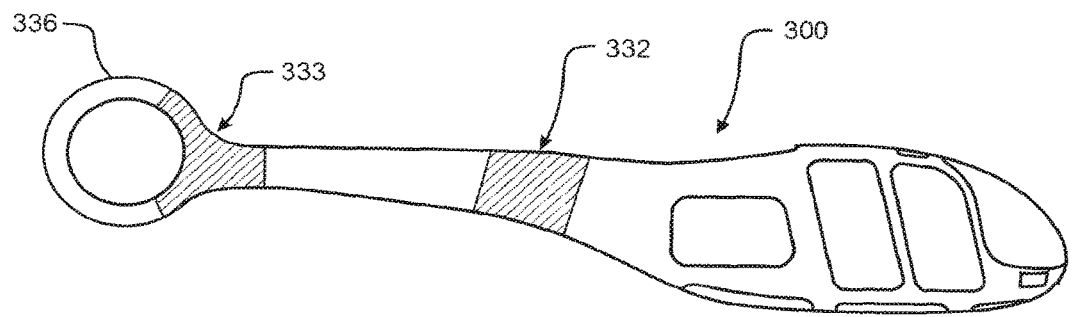
FIG. 31 shows a side view of the preferred helicopter fuselage 300 and empennage 336 showing an area where an additional layer of fabric 332 may be applied to the laminate structure.

FIG. 31 shows a side view of the preferred helicopter fuselage 300 and empennage 336 showing an area where an additional layer of fabric 332 may be applied to the laminate structure. Preferably the additional fabric 332 is located proximate the region where the central section of the fuselage transitions to the tail boom. Preferably the additional layer 332 is CKC or CDB material.

Preferably the empennage is constructed using a laminate structure of CFM and CKC material. The empennage 336 may be joined to the tail boom section of the fuselage 300 by at least one overlapping layer of material 333. Preferably the region of overlap is at least 30 mm. Preferably the overlapping layer of material is a lamination structure of CKC and CKC material.

Figure 32:
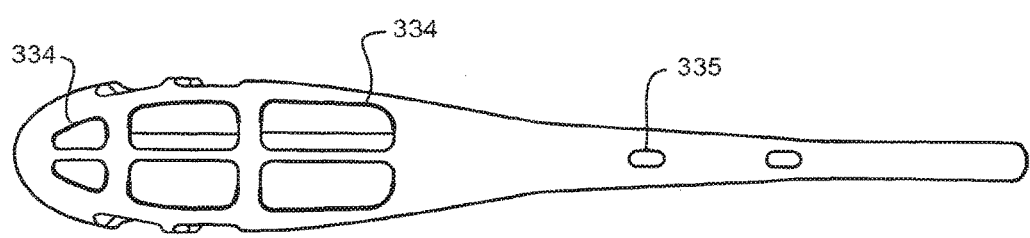
FIG. 32 shows a bottom view of the preferred helicopter and in particular illustrates a plurality of openings delineated by the fuselage.

FIG. 32 shows a bottom view of the preferred helicopter and in particular illustrates a plurality of openings delineated by the fuselage. Preferably each of the openings has an additional layer of fabric material 334, 335 applied to at least part of the edge of the opening. In such circumstances where the opening has a lip or flange, the fabric layer preferably extends from the main surface of the fuselage to the edge of the lip or flange. Preferably the fabric is a CFM material. Further, it may be desirable for multiple layers of additional fabric material to provide additional strength to the region of the fuselage proximate where the fabric is applied. For example, three layers may be applied. Preferably the layers are at least 25 mm in width.

The preferred helicopter fuselage bears a load or force to which the fuselage is subjected to in supporting the weight of the fuselage and associated components and in resisting externally applied forces such as those created by the engine and drive train mechanisms.

Design engineers use the term load path to describe, in general terms, the way in which loads path through a structure from the points of application to the points where they are reacted. In contrast, stress trajectories are more clearly identified by the direction of the principal stress vectors at a point.

Dynamic loads are imparted to the fuselage due to high forward speed. The preferred helicopter fuselage withstands the sum of the loads imparted to the fuselage at 160 kts multiplied by a 3.5 times limit load plus a further 1.5 times ultimate load for 3 seconds. Load must be distributed into the fuselage through the main rotor hub, mast, main rotor gear box, into the main rotor gear box frame and into the keel beams 313 then into the fuselage via a multitude of load paths.

Principally primary structure of the aircraft distributes the load. Secondary structure also carries load but would not lead to a catastrophic failure of the aircraft if damaged.

The tail boom primarily supports the tail rotor. The purpose of the tail rotor is to oppose main rotor torque in the hover and to provide directional control in the hover and at low speed. The tail boom also has to support the dynamic in-flight loads. Ie the upper vertical fin offsets the need for tail rotor thrust in cruise. The lower vertical fin provides stability in an autorotation. The horizontal stabilizers provide for longitudinal stability in forward flight.

The weight of the helicopter must be overcome by main rotor upwards thrust otherwise it will remain grounded. This weight can be referred to as load. This load will vary dependant of the manoeuvring of the helicopter. The main rotor loads are directed into a main rotor gearbox frame. The main rotor gear box frame is preferably attached at six locations to the left and right main keel beams 313. All of the manoeuvring loads are transferred into the fuselage structure. The loads developed on the tail boom are transmitted into the center section of the fuselage. The cabin structure has to withstand the dynamic loads from forward and sideways speed. The cabin must also withstand the loads applied from the weight of the occupants on their seats or cargo loads on the cabin floor. All the cabin loads are transferred into the keel beams 313, 314 and into the fuselage.

The invention claimed is:

1. A primary flight structure comprising:
a load bearing composite shell defining at least an exterior of a helicopter fuselage, the fuselage defining at least an integrally formed central fuselage section and tail boom,
wherein the central fuselage section is adapted to enclose at least one of an engine or drive train.

2. The primary flight structure as claimed in claim 1, wherein the tail boom has attached or is adapted to have attached at least one of an empennage, fins, or tail rotor mechanism.

3. The primary flight structure as claimed in claim 2, wherein the empennage is adapted to support a ducted fan tail rotor assembly, horizontal and vertical stabilisers.

4. The primary flight structure as claimed in claim 1, wherein the tail boom is adapted to have attached an empennage to thereby form a monocoque structure.

5. The primary flight structure as claimed in claim 1, further comprising a forward section of the fuselage adapted to house one or more occupants and flight controls.

6. The primary flight structure as claimed in claim 5, wherein the central section and forward section of the fuselage delineate at least one of a door, window or hatch opening.

7. The primary flight structure as claimed in claim 5, further comprising at least two members components extending between at least an upper and lower internal surface of the fuselage, wherein the at least two members components further comprise an integrally formed and forward protruding substructure adapted to extend from the central fuselage section to the forward section, the protruding substructure having a lower region adapted to attach to a lower internal surface of the composite shell and an upper region adapted to support a cabin floor panel.

8. The primary flight structure as claimed in claim 7, wherein the forward section of the fuselage and the cabin floor panel at least partly define a cabin space such that seating for occupants and flight controls can be located.

9. The primary flight structure as claimed in claim 7, wherein the cabin floor panel is supported by the forward protruding substructure and a plurality of structural members, the structural members adapted to extend between the lower side of the cabin floor panel and the internal surface of the lower region of the composite shell.

10. The primary flight structure as claimed in claim 9, wherein the structural members are adapted to attach to the cabin floor panel and the internal surface of the composite shell.

11. The primary flight structure as claimed in claim 9, wherein the structural members comprise a first set of members and second set of members and the first set of members are adapted to extend substantially perpendicular to the second set of members such that the structural members together, when combined, are adapted to form a lattice structure extending between the cabin floor panel and the internal surface of the composite shell.

12. The primary flight structure as claimed in claim 1, wherein the structure delineates an opening located in an upper region of the exterior of the helicopter fuselage, the opening adapted to allow at least one of an engine or main rotor gearbox or drive train module to be at least partly inserted into the fuselage.

13. The primary flight structure as claimed in claim 1, further comprising at least two members components extending between at least an upper and lower internal surface of the fuselage.

14. The primary flight structure as claimed in claim 13, wherein the members provide support for at least one of an engine or main rotor gearbox or drive train module, or at least support for a frame assembly to which at least one of an engine or main rotor gearbox or drive train module are adapted to be attached.

15. The primary flight structure as claimed in claim 13, further comprising at least two members extending at least between side internal surfaces of the fuselage and transversely to the at least two members components extending between at least an upper and lower internal surface of the fuselage.

16. The primary flight structure as claimed in claim 15, wherein at least one more selected from the at least two members and the at least two members components is adapted to transfer load created by at least one of an engine or main rotor gearbox or drive train module to the composite shell.

17. The primary flight structure as claimed in claim 1, wherein the composite shell comprises a laminate, the laminate comprising a plurality of fabric layers.

18. The primary flight structure as claimed in claim 1, wherein an outer surface layer of the load bearing composite shell is formed as a substantially smooth and substantially continuous surface that extends through at least the central fuselage section to the tail boom.

* * * * *